US011939148B2

(12) United States Patent
Havener

(10) Patent No.: US 11,939,148 B2
(45) Date of Patent: Mar. 26, 2024

(54) METHOD AND APPARATUS FOR COLLAPSIBLE CONTAINER

(71) Applicant: Havener Enterprises, Inc., Bradley, IL (US)

(72) Inventor: Christopher Havener, Bradley, IL (US)

(73) Assignee: HAVENER ENTERPRISES, INC., Bradley, IL (US)

( * ) Notice: Subject to any disclaimer, the term of this patent is extended or adjusted under 35 U.S.C. 154(b) by 410 days.

(21) Appl. No.: 17/236,420

(22) Filed: Apr. 21, 2021

(65) Prior Publication Data

US 2021/0237967 A1 Aug. 5, 2021

Related U.S. Application Data

(60) Continuation-in-part of application No. 17/173,861, filed on Feb. 11, 2021, now Pat. No. 11,511,935, which is a division of application No. 16/135,192, filed on Sep. 19, 2018, now Pat. No. 10,947,037.

(60) Provisional application No. 62/640,884, filed on Mar. 9, 2018.

(51) Int. Cl.

| | |
|---|---|
| ***E05D 7/04*** | (2006.01) |
| ***B65D 21/02*** | (2006.01) |
| ***B65D 88/02*** | (2006.01) |
| ***B65D 88/12*** | (2006.01) |
| ***B65D 88/26*** | (2006.01) |
| ***B65D 88/52*** | (2006.01) |

(Continued)

(52) U.S. Cl.
CPC ....... *B65D 88/524* (2013.01); *B65D 21/0209* (2013.01); *B65D 88/022* (2013.01); *B65D 88/121* (2013.01); *B65D 88/127* (2013.01); *B65D 88/26* (2013.01); *B65D 88/528* (2013.01); *E05D 7/04* (2013.01); *B65D 88/005* (2013.01); *B65D 90/0086* (2013.01); *E05D 2007/0484* (2013.01)

(58) Field of Classification Search
CPC .... E05D 5/02; E05D 5/04; E05D 7/04; E05D 2007/04; E05D 2007/048; E05D 2007/0484
USPC ......... 16/221, 234, 270, 272, 356, 357, 387, 16/392
See application file for complete search history.

(56) References Cited

U.S. PATENT DOCUMENTS 3,499,694 A 3/1970 Coppel
4,696,412 A * 9/1987 McGowan ........... B65D 43/167 16/385

(Continued)

*Primary Examiner* — Roberta S Delisle
(74) *Attorney, Agent, or Firm* — KNECHTEL, DEMEUR & SAMLAN

(57) ABSTRACT

A hollow container or box formed from a roof, a first side (i.e., or first upper and lower sides), a second side (i.e., for second upper and lower sides), a rear side (i.e., or rear upper and lower sides), a door (i.e., or upper and lower door), and a base placing the container or box in a fully assembled position. Unique side and end access doors are provided. Each of the sides are releasably coupled or hingedly connected to one another and the adjacent sides are hingedly coupled to the base. Upon releasing the sides from one another and rotating each relative to one another in a particular order along various axis rotation, the container or box is transitioned from a fully assembled position into a flat, parallel orientation, fully collapsed position.

5 Claims, 21 Drawing Sheets

(51) Int. Cl.
*B65D 88/00* (2006.01)
*B65D 90/00* (2006.01)

(56) References Cited

U.S. PATENT DOCUMENTS

| | | | | |
|---|---|---|---|---|
| 5,943,738 | A * | 8/1999 | Karfiol | E05D 11/082 16/342 |
| 6,588,062 | B2 * | 7/2003 | Novin | G06F 1/1679 16/338 |
| 6,684,457 | B2 * | 2/2004 | Holt | E05D 5/065 16/362 |
| 6,810,563 | B1 * | 11/2004 | Domenig | E05D 7/0423 16/236 |
| 7,725,990 | B2 * | 6/2010 | Patzold | E05D 11/00 16/389 |
| 9,091,104 | B2 * | 7/2015 | Hsu | E05D 5/02 |
| 2003/0126719 | A1 * | 7/2003 | Chen | G06F 1/1616 16/342 |
| 2005/0150078 | A1 * | 7/2005 | Bittner | E05F 15/614 16/221 |
| 2008/0184530 | A1 * | 8/2008 | Chao | E05D 11/082 16/342 |
| 2012/0257922 | A1 * | 10/2012 | Lin | E05D 5/04 403/161 |
| 2013/0283567 | A1 * | 10/2013 | Yamaguchi | E05D 3/02 16/260 |
| 2016/0083176 | A1 | 3/2016 | Kraft | |
| 2016/0109909 | A1 * | 4/2016 | Kim | G06F 1/1681 361/679.55 |

* cited by examiner

METHOD AND APPARATUS FOR COLLAPSIBLE CONTAINER

I. CROSS-REFERENCE TO RELATED APPLICATION

This patent application is a continuation-in-part of prior U.S. patent application Ser. No. 17/173,861, entitled "Method and Apparatus for Collapsible Container", filed on Feb. 11, 2021, still pending, which is a divisional of prior U.S. patent application Ser. No. 16/135,192, entitled "Method and Apparatus for Collapsible Container", filed on Sep. 19, 2018, still pending, which claims priority from U.S. Provisional Patent Application Ser. No. 62/640,884, entitled "Method and Apparatus for Collapsible Box", filed on Mar. 9, 2018, and is fully incorporated herein by reference.

II. FIELD OF THE INVENTION

The present invention relates to storage containers or boxes and, more particularly, to a method and apparatus for collapsing storage containers or boxes from a fully double stacked assembled position to a single stacked assembled position to a fully collapsed position.

III. BRIEF DESCRIPTION OF THE DRAWINGS

The Description of the Preferred Embodiment will be better understood with reference to the following figures.

Figure 10:
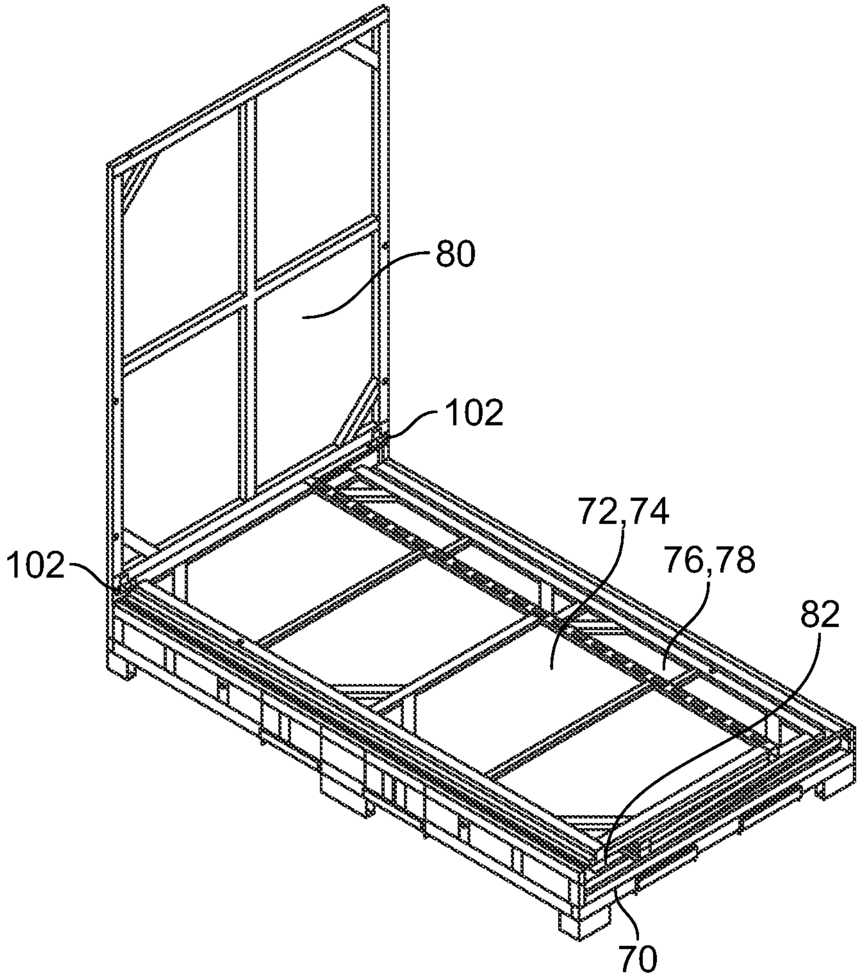
Figure 11:
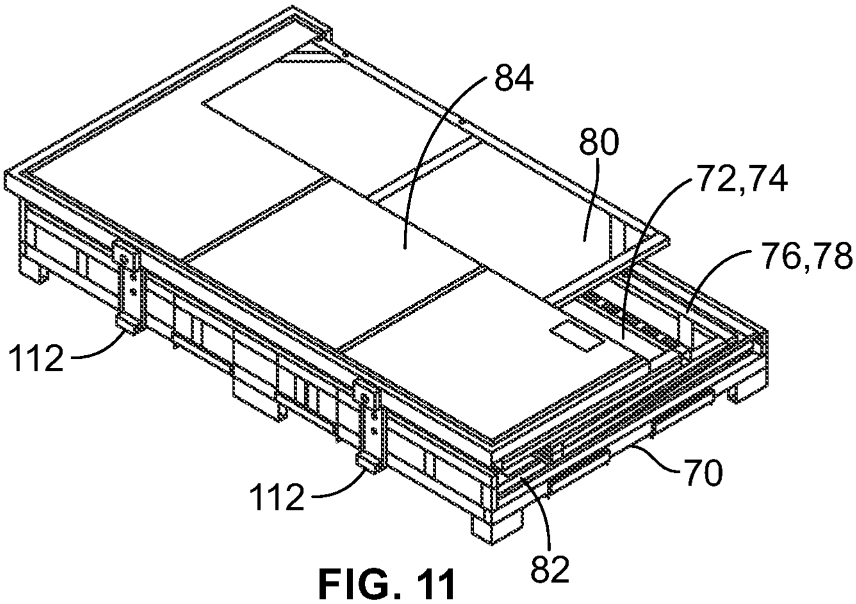

FIG. 10 is a perspective view of the first alternate preferred embodiment of Applicant's inventive collapsible container and, in particular, illustrating the container further in the process of collapsing from its fully assembled position to a fully collapsed position FIG. 11 is a perspective view of the first alternate preferred embodiment of Applicant's inventive collapsible container and, in particular, illustrating the container in the fully collapsible position.

Figure 12:
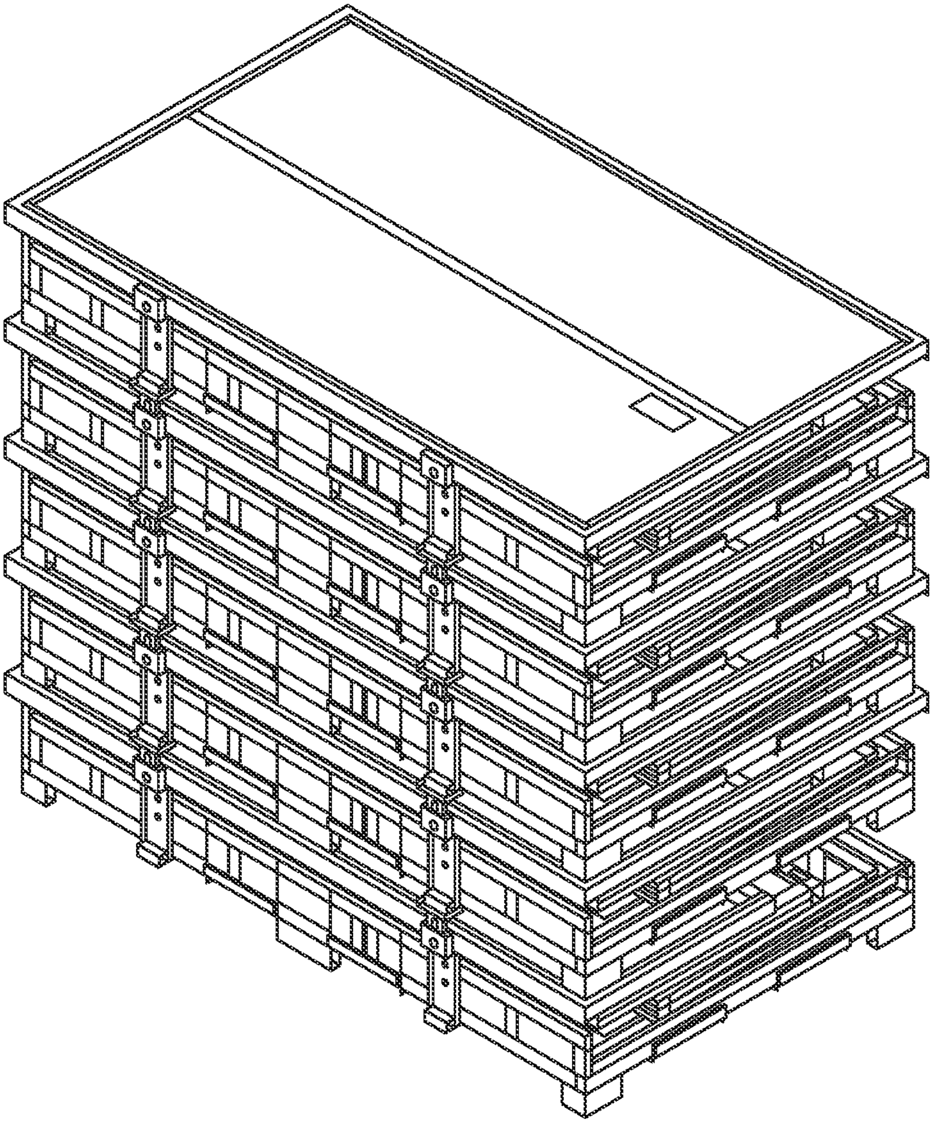

FIG. 12 is a perspective view of the first alternate preferred embodiment of Applicant's inventive collapsible container and, in particular, illustrating many separate container(s), each in their fully collapsible position, stacked upon one another.

Figure 13:
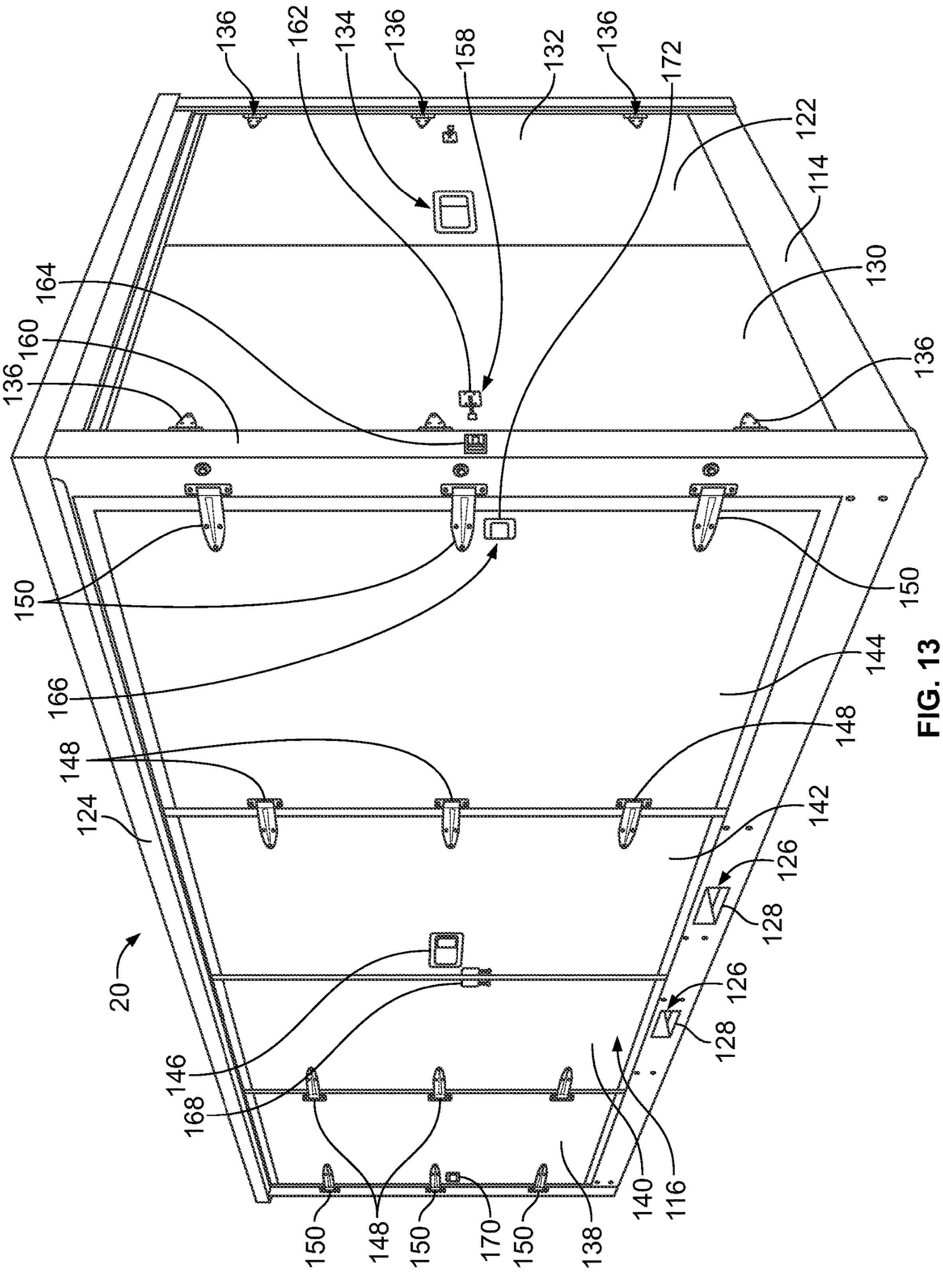

FIG. 13 is a perspective view of a second alternate preferred embodiment of Applicant's inventive collapsible container and, in particular, illustrating the container in the fully assembled position.

Figure 14:
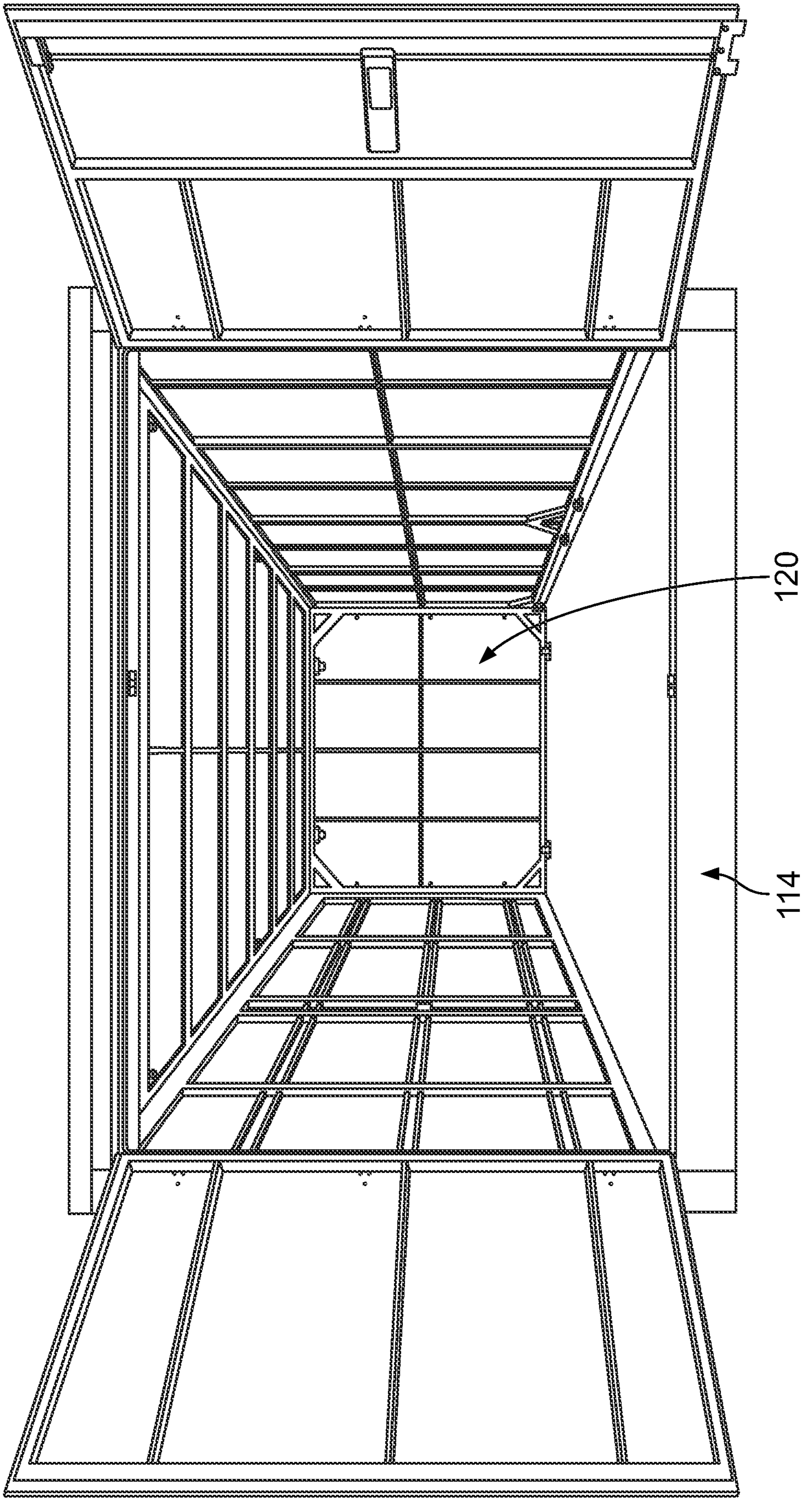

FIG. 14 is a perspective view of a second alternate preferred embodiment of Applicant's inventive collapsible container and, in particular, illustrating the left door and the right door of the end door in the open position.

Figure 15:
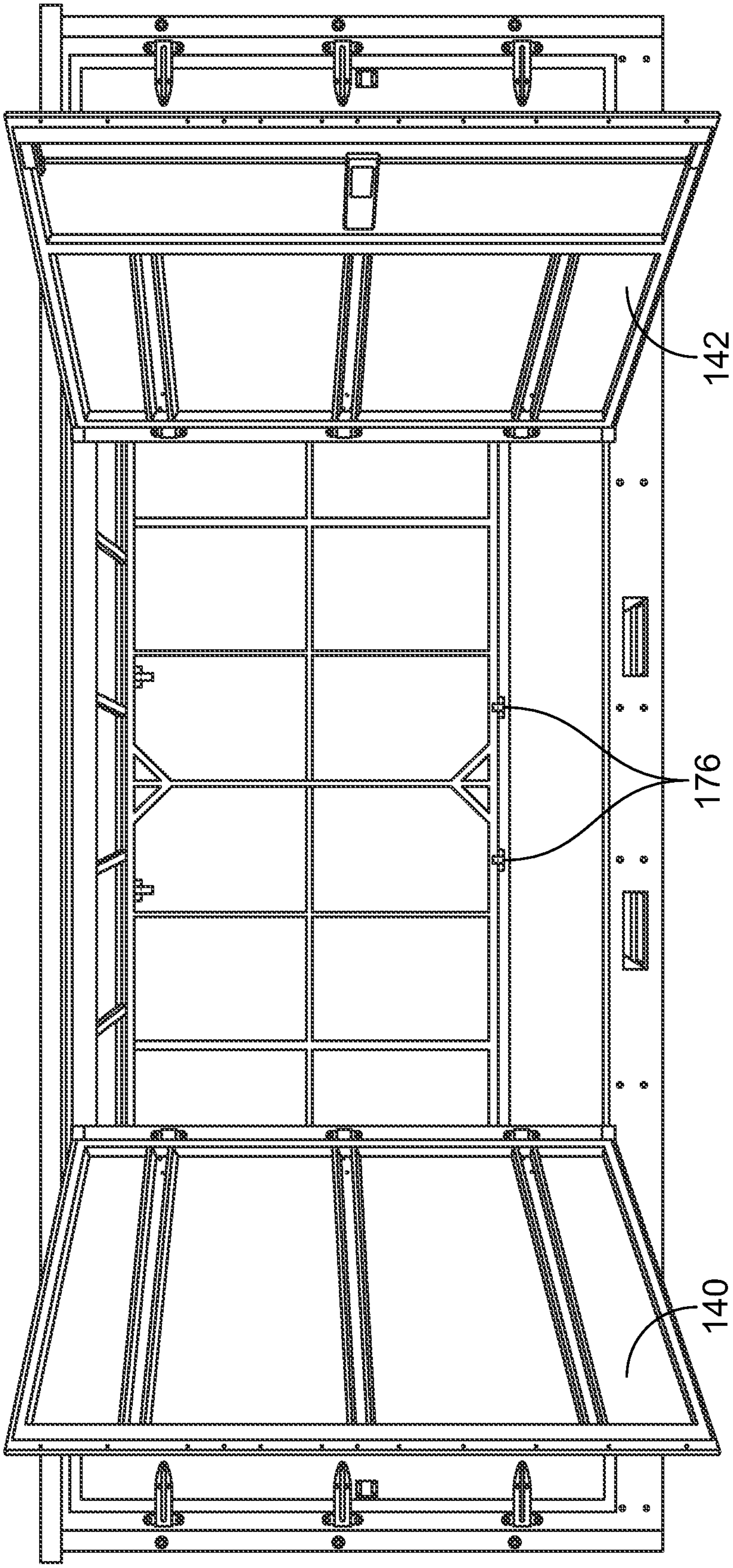

FIG. 15 is a perspective view of a second alternate preferred embodiment of Applicant's inventive collapsible container and, in particular, illustrating the left interior side door and right interior side doors in the open position.

Figure 16:
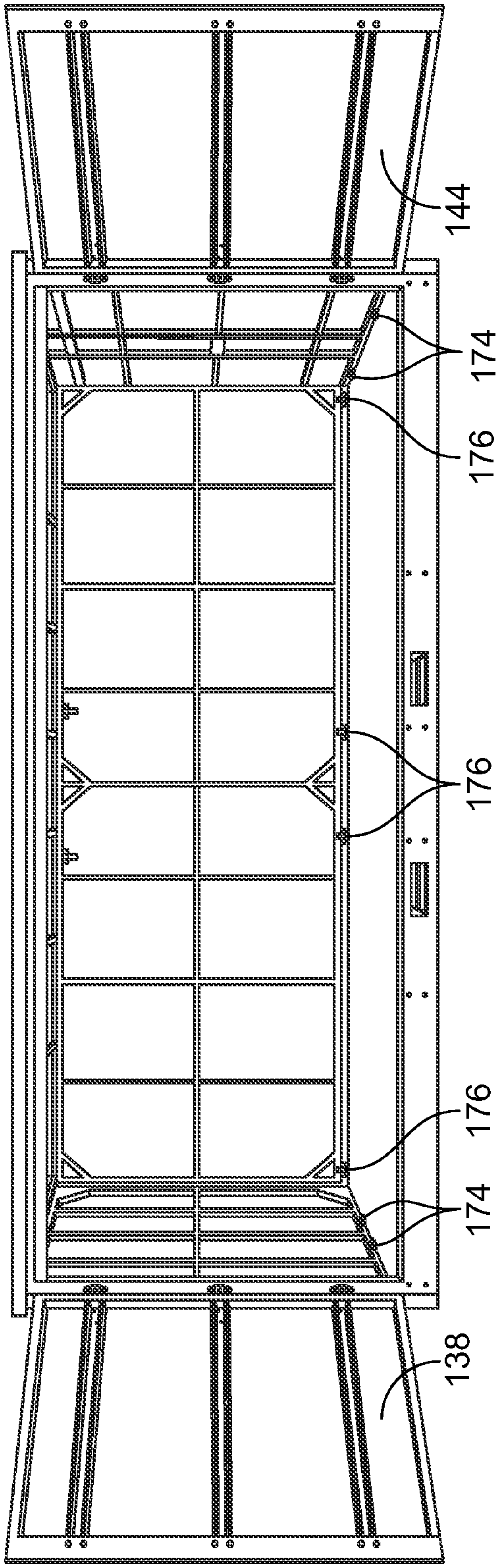

FIG. 16 is a perspective view of a second alternate preferred embodiment of Applicant's inventive collapsible container and, in particular, illustrating all of the left outside side door, the left interior side door, the right interior side door, and right outside side door in the open position.

Figure 17:
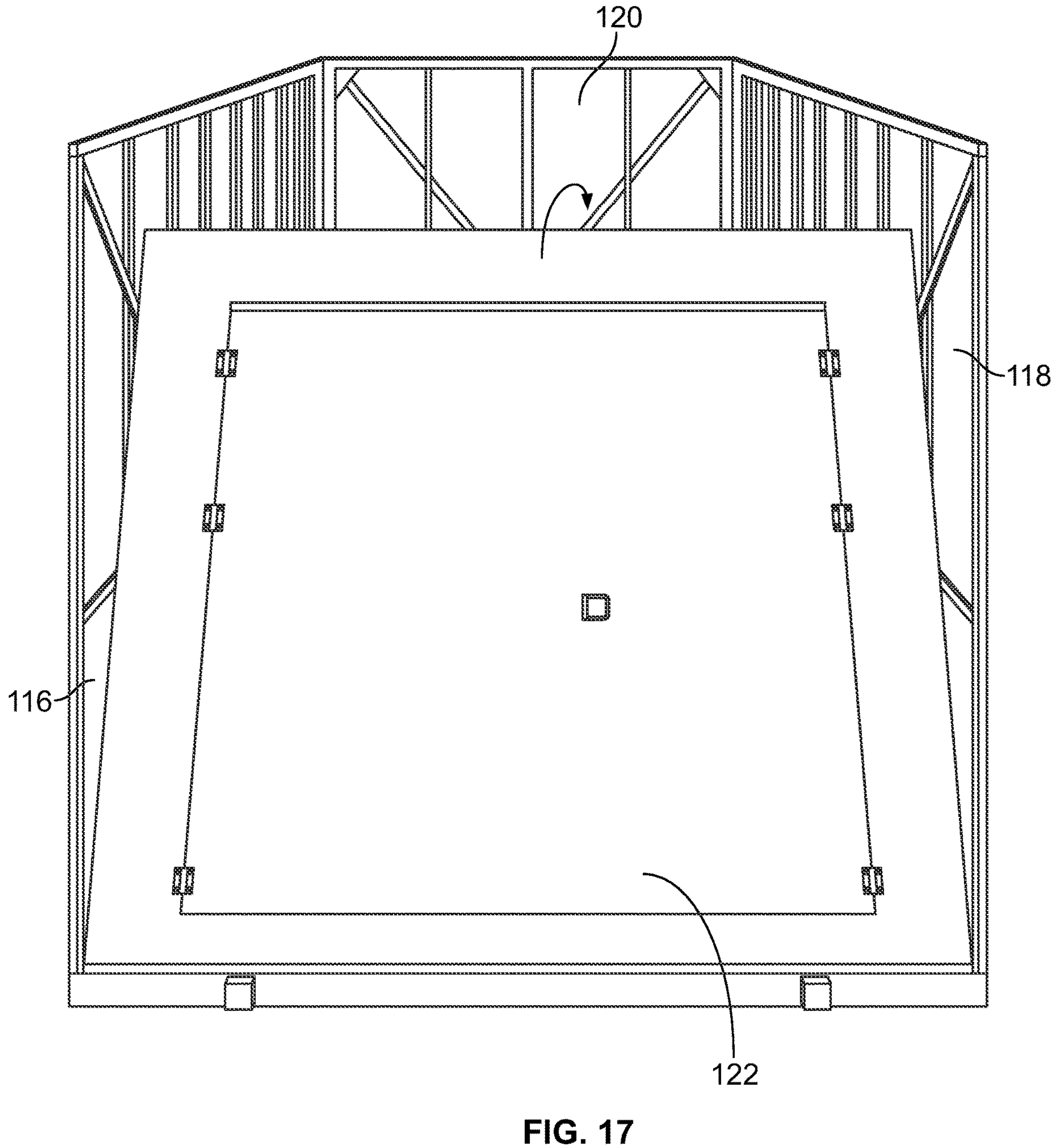

FIG. 17 is a perspective view of the second alternate preferred embodiment of Applicant's inventive collapsible container and, in particular, illustrating the container in the process of collapsing from its fully assembled position to a fully collapsed position.

Figure 18:
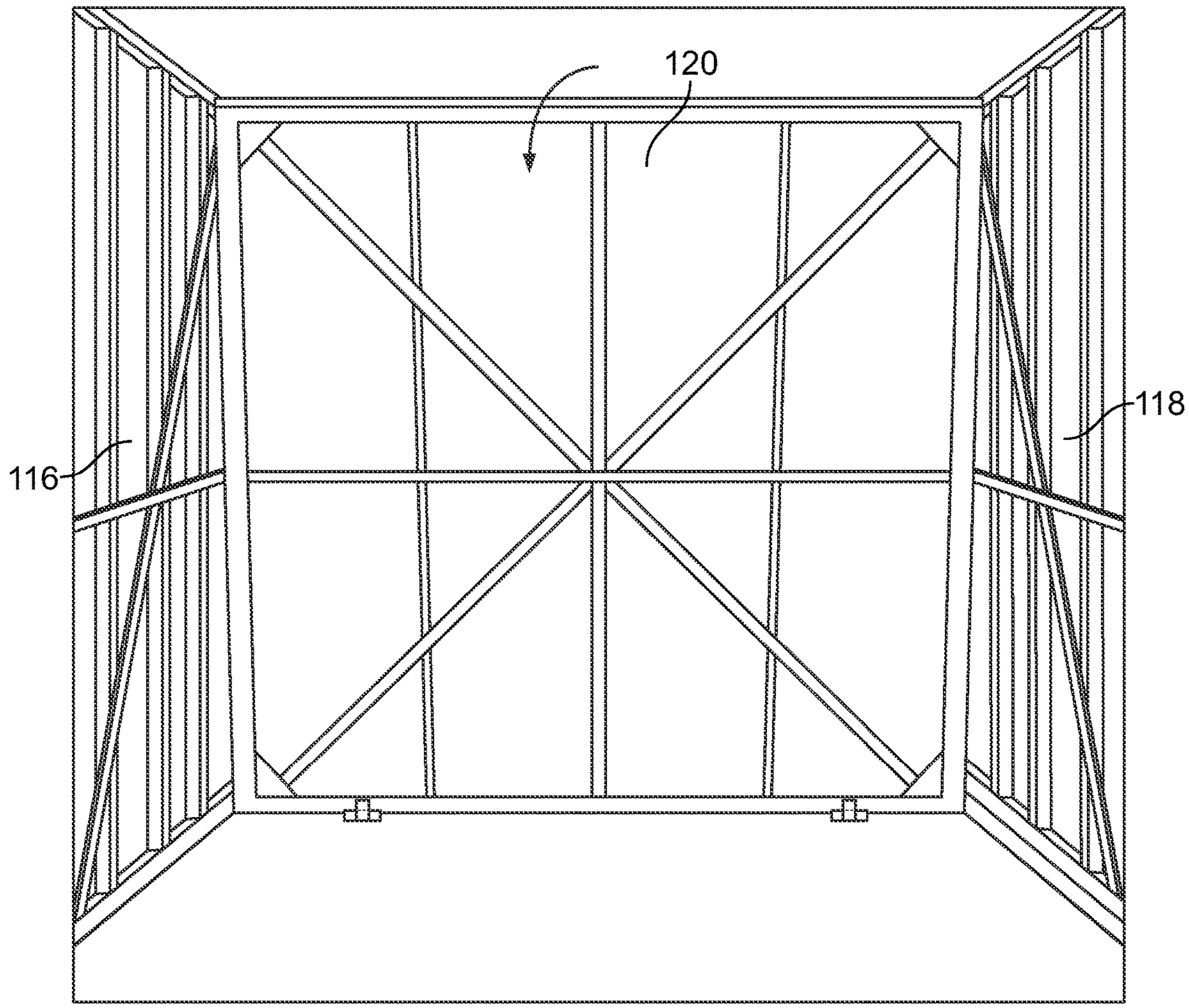

FIG. 18 is a perspective view of the second alternate preferred embodiment of Applicant's inventive collapsible container and, in particular, illustrating the rear wall folded or collapsed along the exterior of container.

Figure 19:
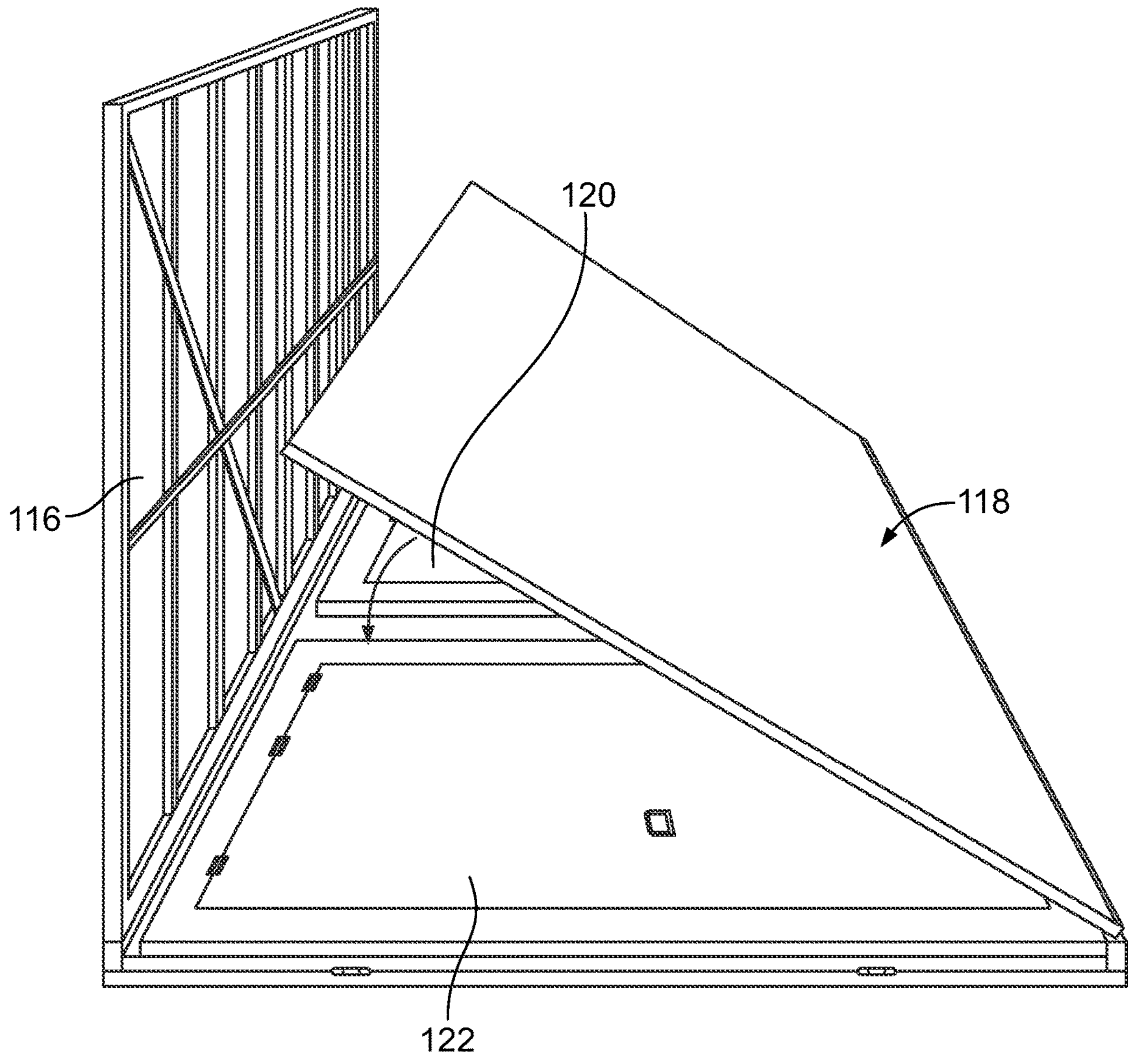

FIG. 19 is a perspective view of the second alternate preferred embodiment of Applicant's inventive collapsible container and, in particular, illustrating the second side wall folded or collapsed along the exterior of container.

Figure 20:
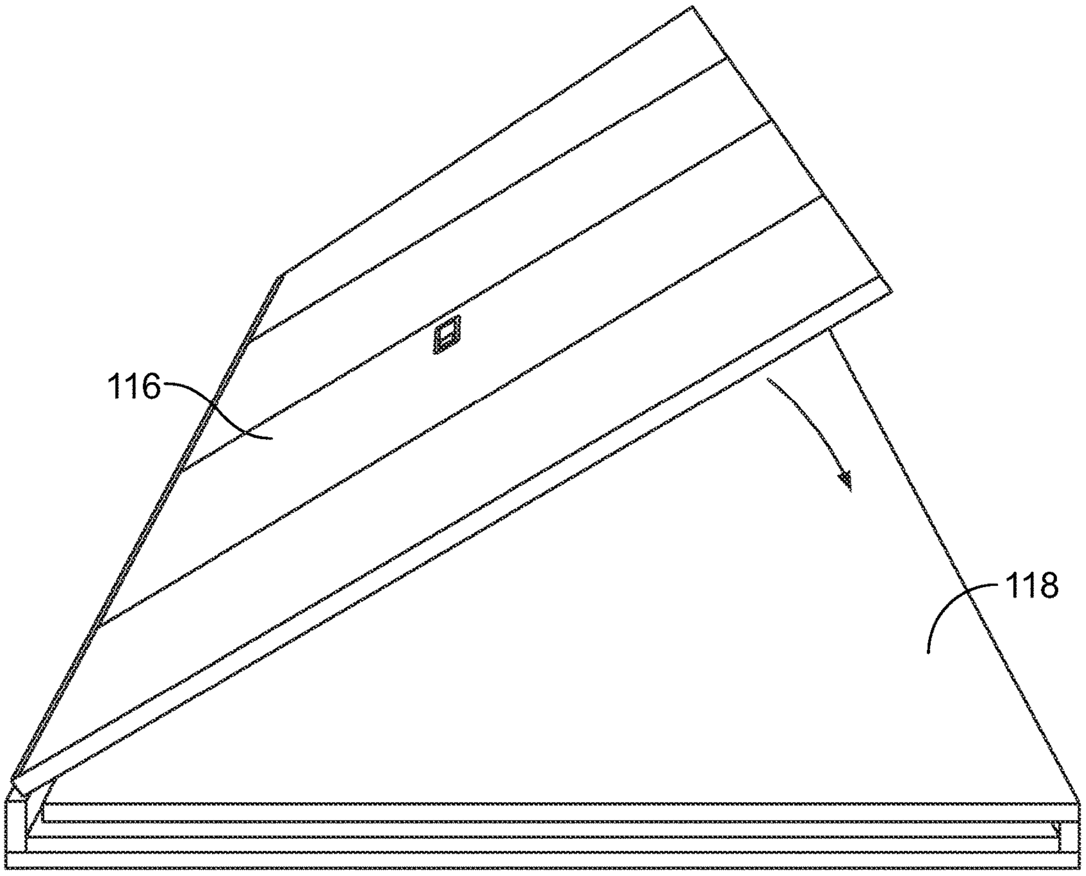

FIG. 20 is a perspective view of the second alternate preferred embodiment of Applicant's inventive collapsible container and, in particular, illustrating the first side wall folded or collapsed along the exterior of container.

Figure 21:
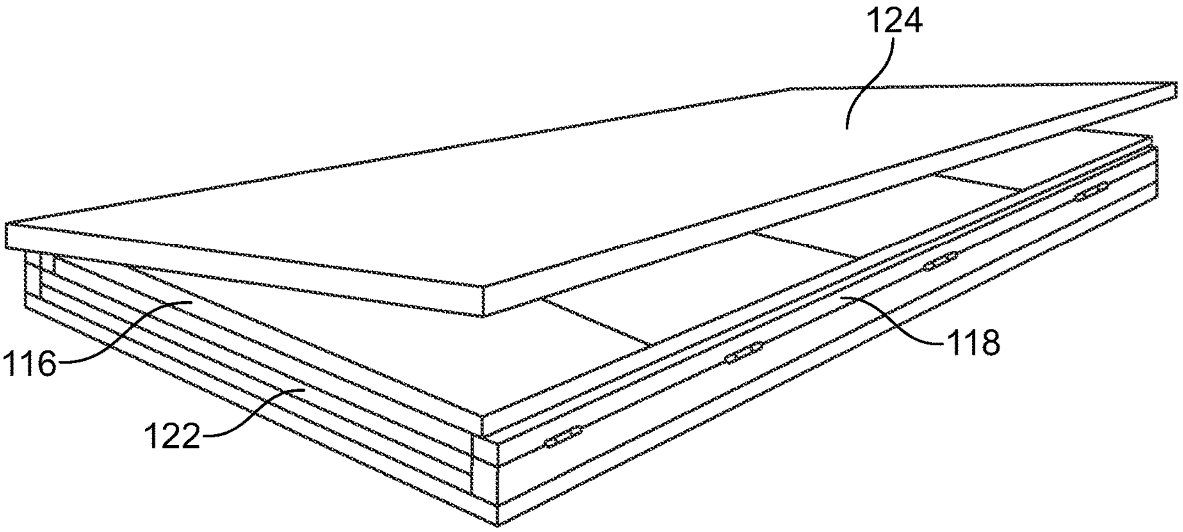

FIG. 21 is a perspective view of the second alternate preferred embodiment of Applicant's inventive collapsible container and, in particular, illustrating the container in the fully collapsible position.

Figure 22:
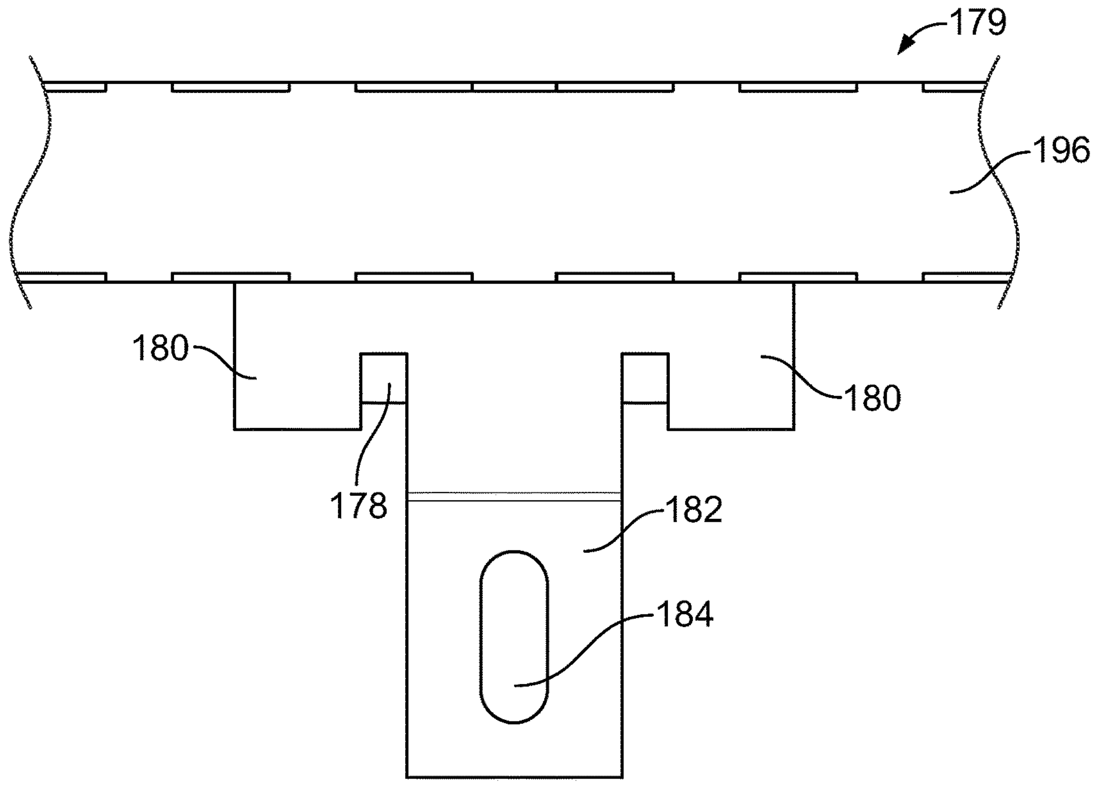

FIG. 22 is a front perspective view of an alternate embodiment of a hinge means used in any of the containers disclosed herein.

Figure 23:
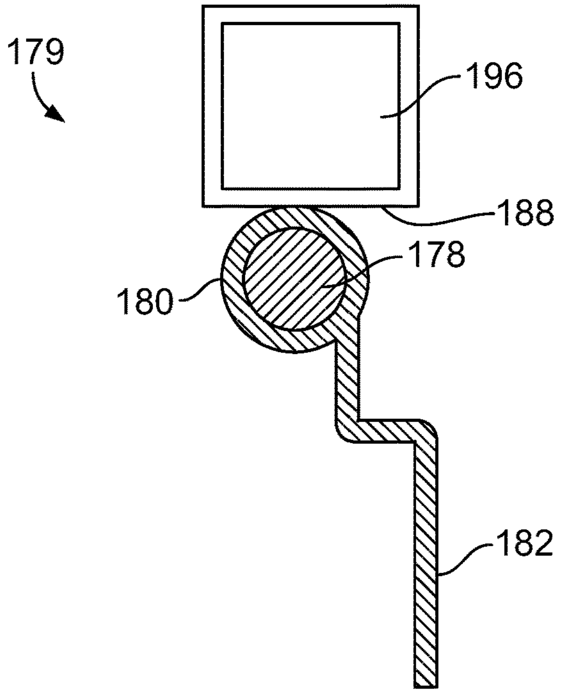

FIG. 23 is a side perspective view of the alternate embodiment of the hinge means.

Figure 24:
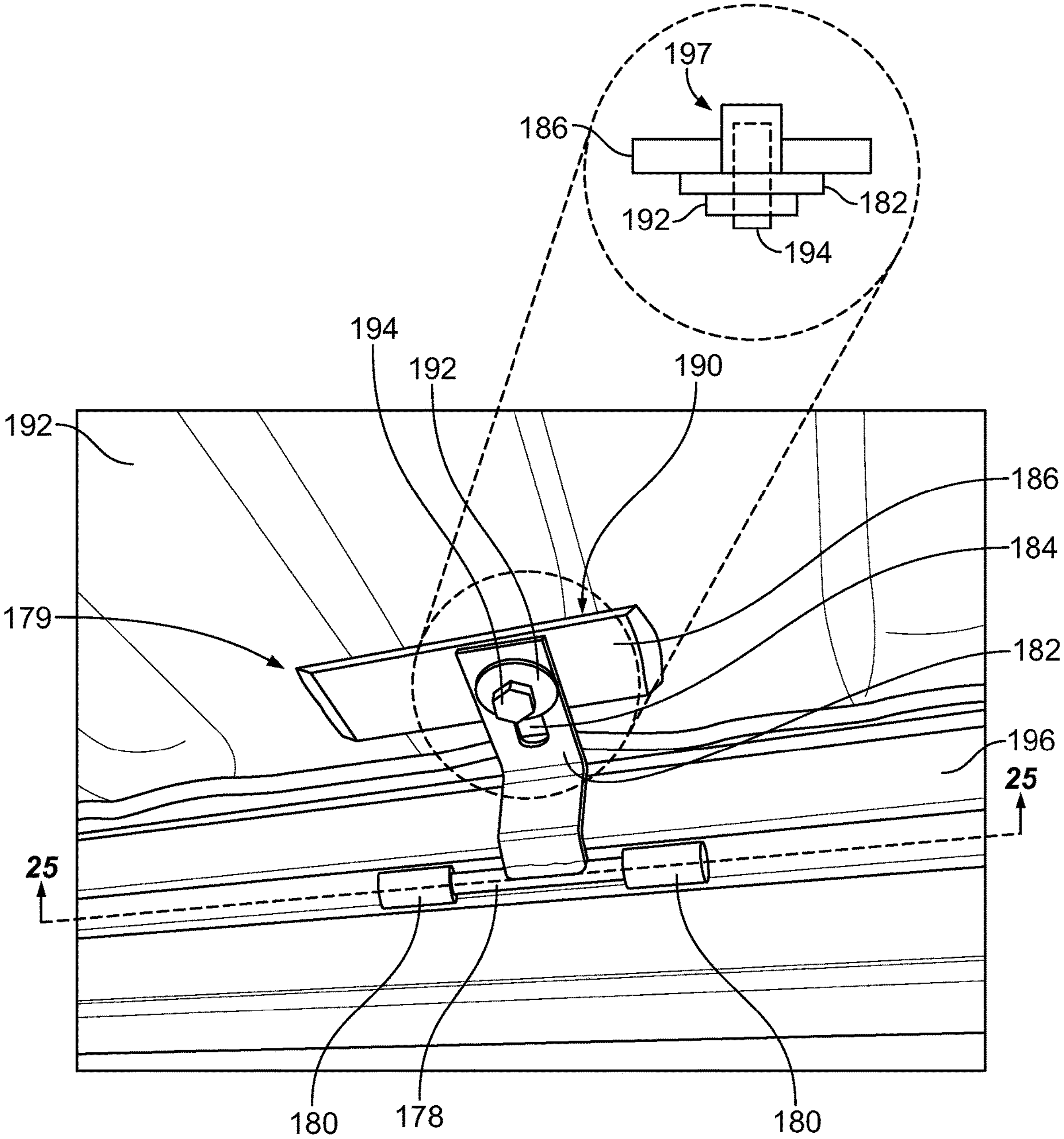

FIG. 24 is a perspective view of the alternate embodiment of the hinge means and, in particular, illustrating as used in the container.

Figure 25:
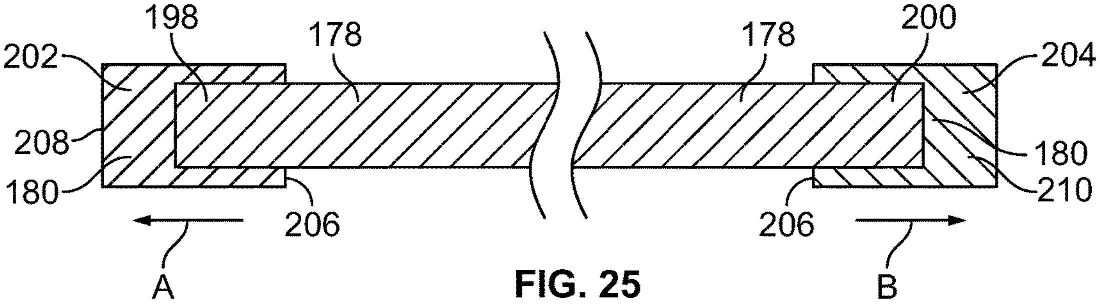

FIG. 25 is a cross-sectional view, taken along line 25-25 of FIG. 24, of the alternate embodiment of the hinge means.

IV. SUMMARY OF THE INVENTION

The present invention is a hollow container or box formed from a roof, a first side (i.e., or first upper and lower sides), a second side (i.e., or second upper and lower sides), a rear side (i.e., or rear upper and lower sides), a door (i.e., or upper and lower door), and a base placing the container or box in a fully assembled position. Unique side and end access doors are provided. Each of the sides are releasably coupled or hingedly connected to one another and the adjacent sides are hingedly coupled to the base. Upon releasing the sides from one another and rotating each relative to one another in a particular order along various axis rotation, the container or box is transitioned from a fully assembled position into a flat, parallel orientation, fully collapsed position.

V. DETAILED DESCRIPTION OF THE PREFERRED EMBODIMENT

Figure 7:
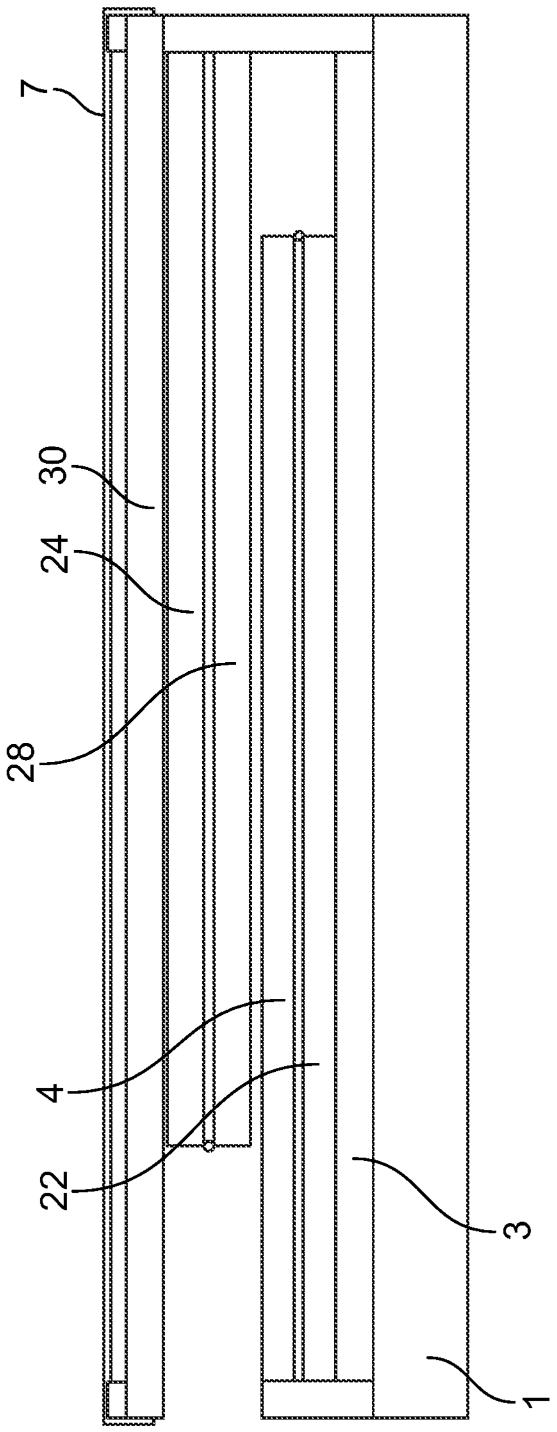
FIG. 7 is a perspective view of Applicant's inventive collapsible container and, in particular, illustrating the container in the fully collapsible position.

Turning first to FIG. 1, there is illustrated Applicant's inventive collapsible container or box 20 (also referred to herein as "container 20"). In the preferred embodiment, the container 20 is a storage container or box and, in particular, a container used for the storage of materials and any consumer products of the owner or, more typically, a lessee. The container 20, as illustrated, is in the fully double stacked assembled position and, as described in more detail below, may be collapsed from its fully double stacked assembled position to a single stacked assembled position, as illustrated in FIG. 2; and then from the single stacked assembled position to a fully collapsed position, as illustrated in FIG. 7.

The container 20 comprises a first container 21, a second container 23, and a roof 7. In the preferred embodiment, the second container 23 is stacked or situated on top of the first container 21 and is then covered by the roof 7.

The first container 21 comprises a base 1, a first lower side wall 22, a second lower side wall 24, a lower back wall 26 (see FIGS. 2 and 4), and a lower door 3; the second container 23 comprises a first upper side wall 4, a second upper side wall 28, an upper back wall 30, and an upper door 32.

Situated within the base 1 are castings 34 each having a plurality of openings 36 for lifting the container 20 by forklift or other lift trucks. Also, provided within the base 1 are swivel wheels 10 to assist in moving the container 20 as well. Likewise, a global positioning system 8 is retained within the base 1 for tracking the location and/or positioning of the container 20. Alternatively, in the preferred embodiment, any global positioning system 8 may be used in any location within the container 20.

Figure 3A:
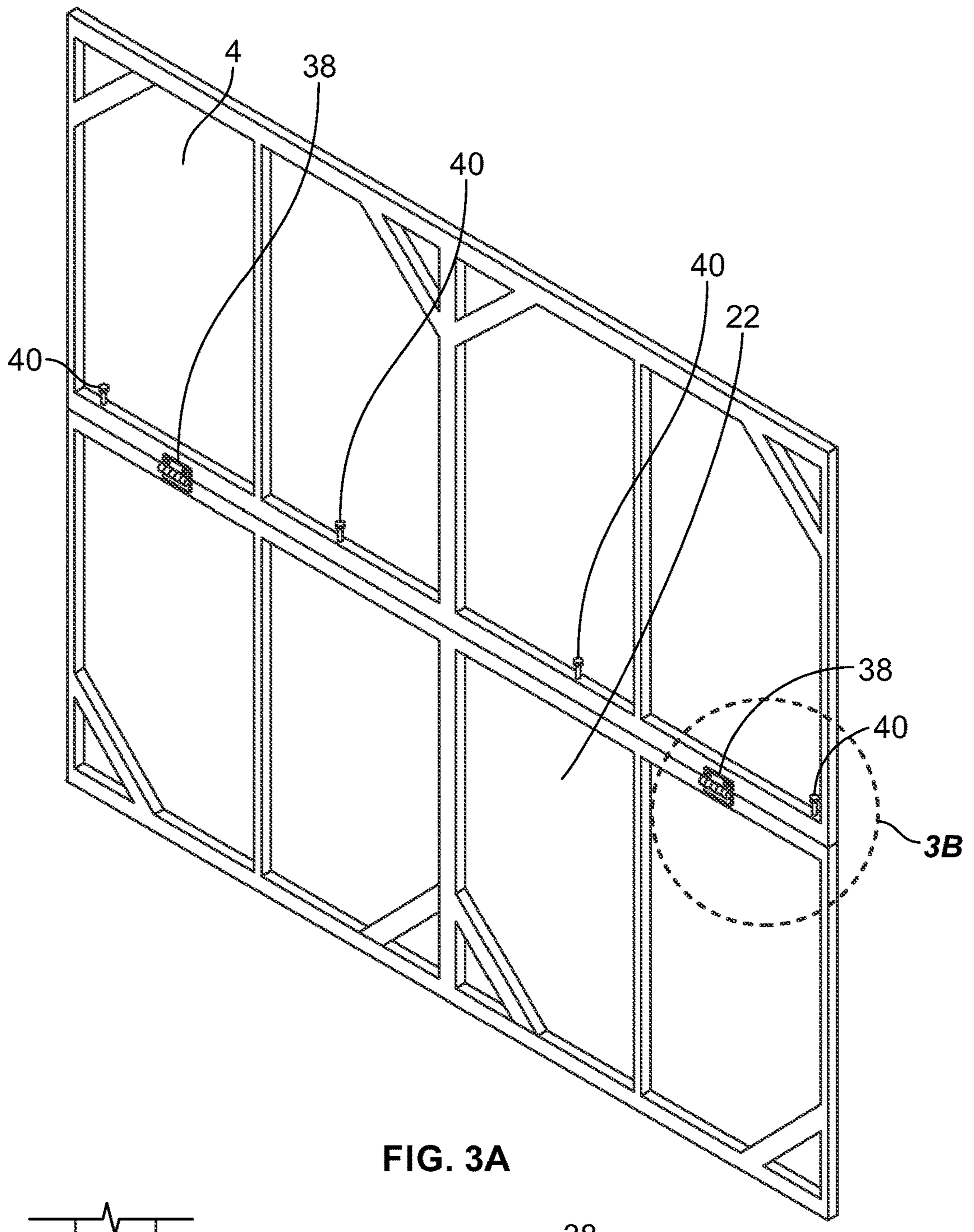
FIG. 3A is a perspective view of the connection of the lower side walls (first and second) to the upper side walls (first and second).
Figure 3C:
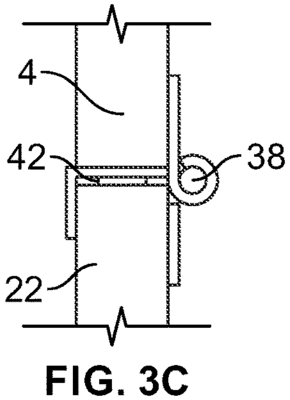
FIG. 3C is a cross-sectional view of the hinge means used in securing the lower side walls (first and second) to the upper side walls (first and second).
Figure 3B:
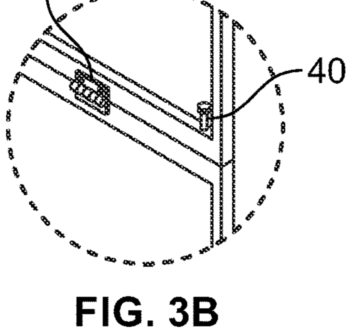
FIG. 3B is a perspective view of the fastening means used in securing the lower side walls (first and second) to the upper side walls (first and second).

As illustrated in FIG. 3, the first lower side wall 22 is hingedly connected to the first upper side wall 4 by a hinge means 38. In the preferred embodiment, the hinge means 38 comprises a single hinge, is rotatable through at least 180 degrees, and is located on the inside of the container 20. In the non-limiting example as illustrated, there are two (2) single hinges 38, equally spaced apart, that are used to hingedly connect the first lower side wall 22 to the first upper side wall 4. Alternatively, the total number of single hinges 38 used to connect the first lower side wall 22 to the first upper side wall 4 may be more or less depending upon the type, size, or shape of container 20 used.

The first lower side wall 22 and the first upper side wall 4 are fixedly secured to one another using a plurality of bolts 40. A rubber seal strip 42, tightened between the first lower side wall 22 and the first upper side wall 4 is provided to prevent rain, moisture, and other contaminants from entering the container 20. Also, the first upper side wall 4 has a width that is slightly less than the width of the first lower side wall 22 to accommodate the transformation or collapsing as described in more detail below.

The second lower side wall 24 is likewise secured to the second upper side wall 28 in the exact same manner as the first lower side wall 22 to the first upper side wall 4. Also, the second upper side wall 28 likewise has a width that is slightly less than the width of the second lower side wall 24 to accommodate the transformation or collapsing as described in more detail below.

Figure 4A:
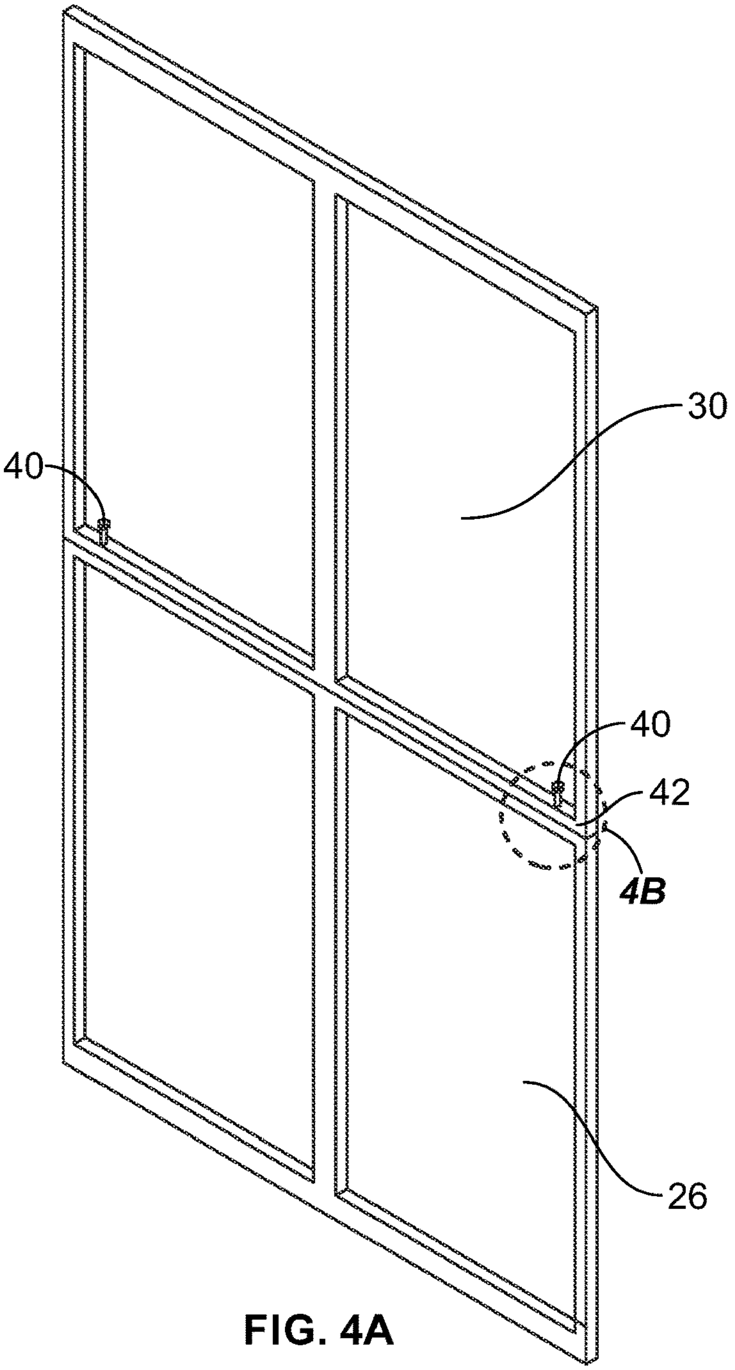
FIG. 4A is a perspective view of the connection of the lower back wall to the upper back wall.
Figure 4B:
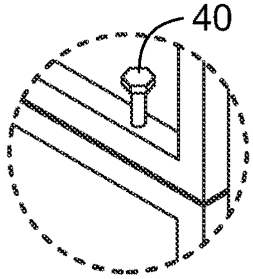
FIG. 4B is a perspective view of the fastening means used in securing the lower back wall to the upper back wall.
Figure 4C:
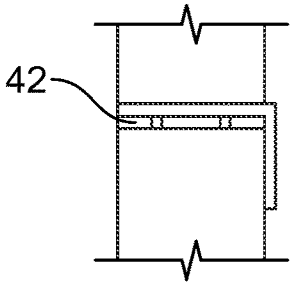
FIG. 4C is a cross-sectional view of rubber seal situated between the upper and lower walls of the storage container.

As illustrated in FIG. 4, the lower back wall 26 and the upper back wall 30 are fixedly secured to one another using the plurality of bolts 40. The rubber seal strip 42 is also tightened between the lower back wall 26 and the upper back wall 30 to prevent rain, moisture, and other contaminants from entering the container 20.

Figure 5:
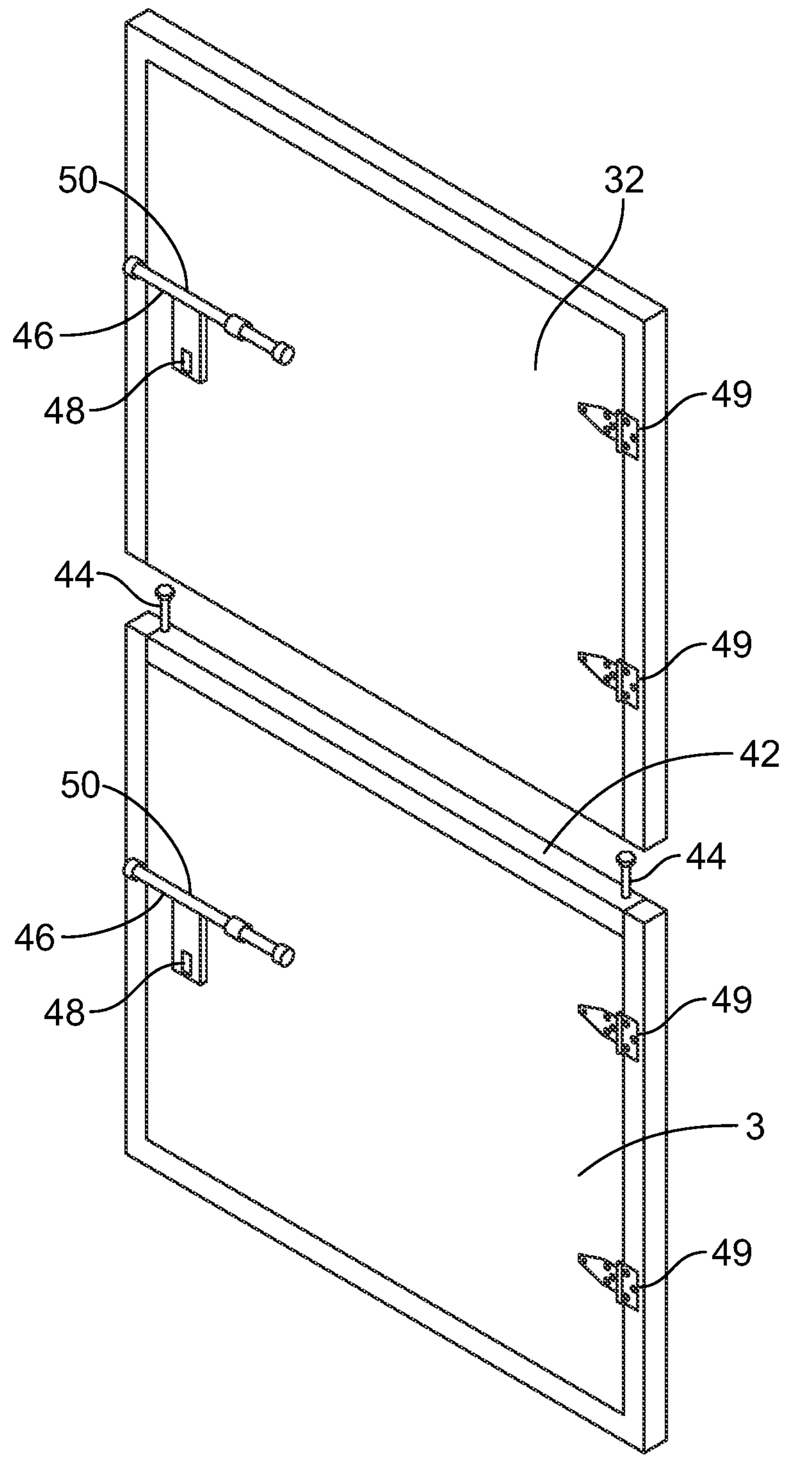
FIG. 5 is a perspective view of the connection of the lower door to the upper door; and further, the locking means and hinge means of each of the lower door and the upper door in relation to the lower side walls (first and second) and upper side walls (first and second).

As illustrated in FIG. 5, the lower door 3 and the upper door 32 collectively extend between the roof 7 and the base 1. The lower door 3 is releasably secured to the upper door 32 by connecting bolts 44 situated at the opposed ends of the doors, respectively. Preferably, the connecting bolts 44 are fixedly retained in the lower door 3 and then received into a correspondingly aligned receiving channel (not illustrated) in the upper door 32. In the preferred embodiment, the lower door 3 is likewise secured to the first lower side wall 22 and the upper door 32 is secured to the first upper side wall 4 by securing bolts (not illustrated). Each of the lower door 3 and upper door 32 are releasably locked to the second lower side wall 24 and second upper side wall 28, respectively, by a latching means 46. In the preferred embodiment, the latching means 46 comprises a bracket 48, a latch lever and/or latch bolt 50 and a receiving cylinder (not illustrated) on the second lower side wall 24 and second upper side wall 28, respectively. Alternatively, the means for releasably locking the lower door 3 and upper door 32 to the second lower side wall 24 and the second upper side wall 28 may be any other means known to one skilled in the art. Lastly, each of the lower door 3 and upper door 32 are provided with a second hinge means 49. In the preferred embodiment, the second hinge means 49 comprises a single hinge, is rotatable through at least 180 degrees, and allows each of the lower door 3 and upper door 32 to be rotated in connection with their applicable second lower side wall 24 and second upper side wall 28, respectively, thereby allowing the container 20 to be freely opened and closed, as desired.

Turning back to FIGS. 1 and 2, the process for collapsing the container 20 from the fully double stacked assembled position, as illustrated in FIG. 1, to the single stacked assembled position, as illustrated in FIG. 2, is more clearly illustrated.

First, the roof 7 is removed from attachment to the first upper side wall 4, the second upper side wall 28, the upper back wall 30, and the upper door 32. In this manner, the roof 7 is completely removed from the second container 23.

Second, the upper door 32 is removed from attachment to the second container 23. This includes: (a) unlocking the latching means 46 of the upper door 32 from the second upper side wall 28; (b) removing the securing bolts (not illustrated) and thereby unsecuring the upper door 32 from the first upper side wall 4; and (c) lifting the upper door 32 sufficient to release the connecting bolts 44 situated at the opposed ends of the doors, respectively, such that the connecting bolts 44 are removed from the correspondingly aligned receiving channel (not illustrated) within the upper door 32 and thereby remove the upper door 32 from the lower door 3. In this manner, the upper door 32 is completely removed from the second container 23.

Third, the upper back wall 30 is removed from attachment to the first upper side wall 4 and the second upper side wall 28. In this manner, the upper back wall 30 is completely removed from the second container 23.

Fourth, the first upper side wall 4 is folded or collapsed into the first container 21. This includes: (a) removing the plurality of bolts 40 and thereby unsecuring the first upper side wall 4 from the first lower side wall 22; and then, (b) rotating the first upper side wall 4 about the hinge means 38, through substantially 180 degrees, until the first upper side wall 4 is upside down and engages the first lower side wall 22. In this manner, while the first upper side wall 4 and the first lower side wall 22 remain hingedly connected, the first upper side wall 4, originally situated in substantially a vertical orientation in alignment above the first lower side wall 22, is transformed or collapsed into the first container 21 with the first upper side wall 4 becoming situated in substantially a vertical orientation (upside down) and positioned adjacent and parallel to the first lower side wall 22, as illustrated in FIG. 2.

Fifth, the second upper side wall 28 is folded or collapsed into the first container 21. This includes: (a) removing the plurality of bolts 40 and thereby unsecuring the second upper side wall 28 from the second lower side wall 24; and then, (b) rotating the second upper side wall 28 about the hinge means 38, through substantially 180 degrees, until the second upper side wall 28 is upside down and engages the second lower side wall 24. In this manner, while the second upper side wall 28 and the second lower side wall 24 remain hingedly connected, the second upper side wall 28, originally situated in substantially a vertical orientation in alignment above the second lower side wall 24, is transformed or collapsed into the first container 21 with the second upper side wall 28 becoming situated in substantially a vertical orientation (upside down) and positioned adjacent and parallel to the second lower side wall 24, as illustrated in FIG. 2.

Sixth, the upper back wall 30 is then placed adjacent and parallel to the second upper side wall 28, as illustrated in FIG. 2. In this manner, the second lower side wall 24, the second upper side wall 28, and the upper back wall 30 are all situated in a horizontal orientation and aligned adjacent to and parallel relationship to one another and form a single side wall within first container 21. Each of these are secured together within the first container 21 by a fastening means 52. Alternatively, as the upper back wall 30 is completely removed from the second container 23, the upper back wall 30 could be placed against the first lower side wall 22 and the first upper side wall 4 instead.

Seventh, the upper door 32 is then placed adjacent and parallel to the first upper side wall 4, as illustrated in FIG. 2. In this manner, the first lower side wall 22, the first upper side wall 4, and the upper door 32 are all situated in a horizontal orientation and aligned adjacent to and parallel relationship to one another and form a single side wall within first container 21. Each of these are secured together within the first container 21 by a fastening means 52. Alternatively, as the upper door 32 is completely removed from the second container 23, the upper door 32 could be placed against the second lower side wall 24 and the second upper side wall 28 instead.

Figure 1A:
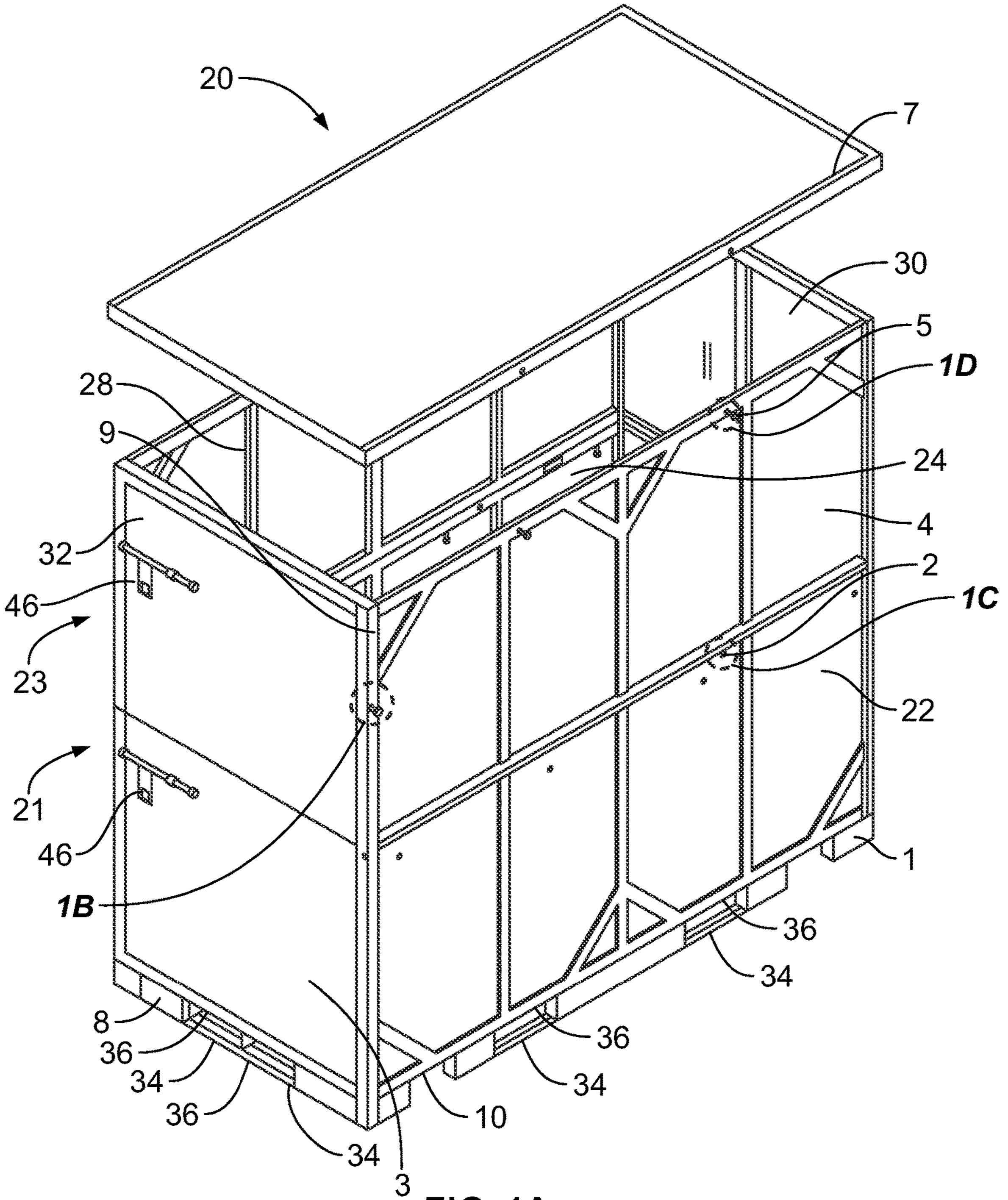
FIG. 1A is a perspective view of Applicant's inventive collapsible container and, in particular, illustrating the container in the fully double stacked assembled position.
Figure 1B:
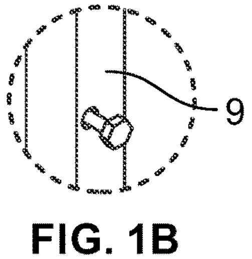
FIG. 1B is a perspective view of the fastening means used in securing the upper side wall to the upper door.
Figure 1C:
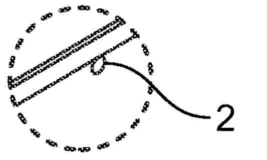
FIG. 1C is a perspective view of the hole used to receive a fastening means in securing the upper side wall to the lower side wall as the storage container or box is being collapsed.
Figure 1D:
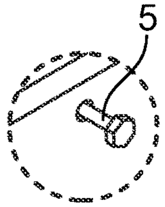
FIG. 1D is a perspective view of the fastening means used in securing the upper side wall to the roof.
Figure 2A:
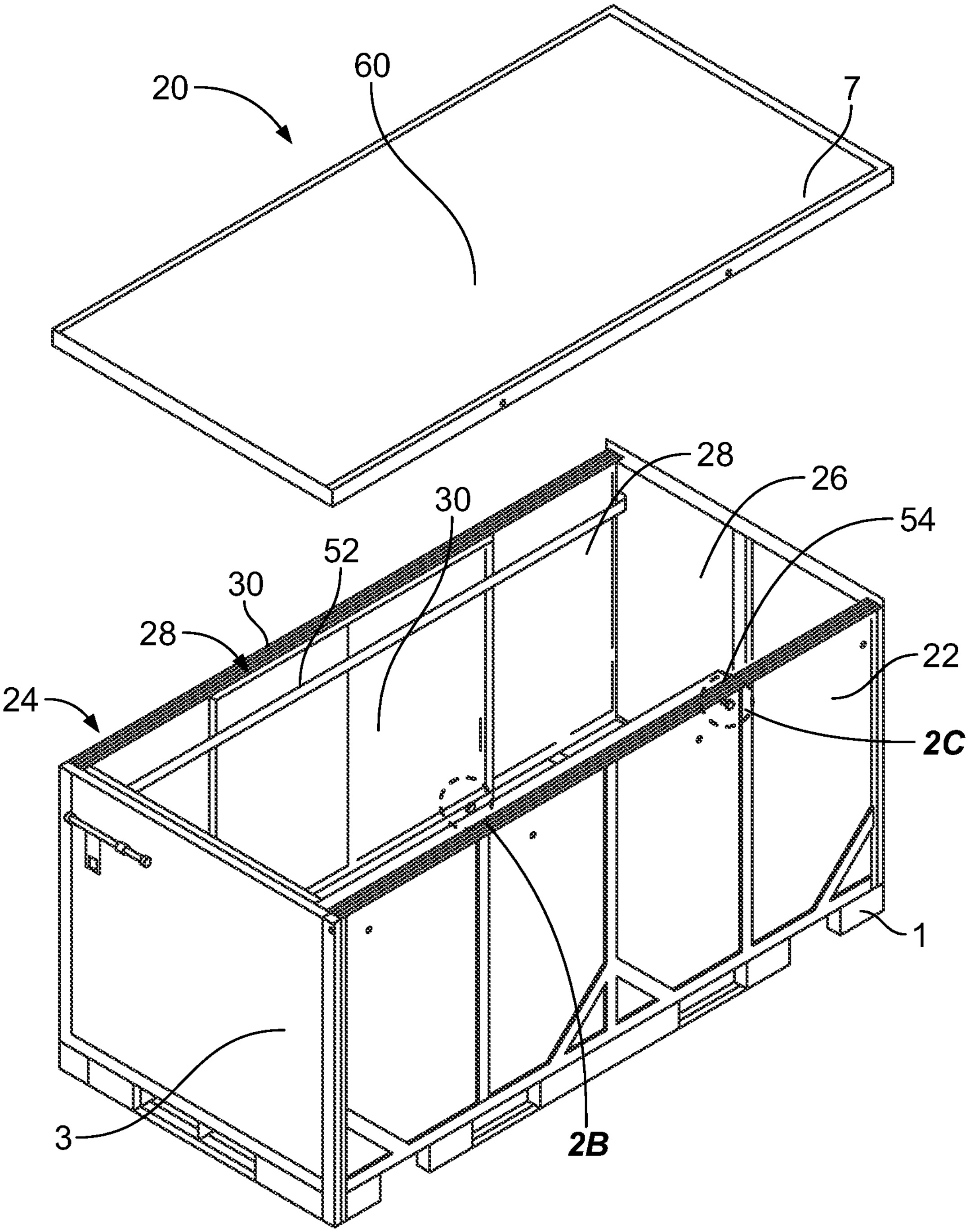
FIG. 2A is a perspective view of Applicant's inventive collapsible container and, in particular, illustrating the container in the single stacked assembled position.
Figure 2B:
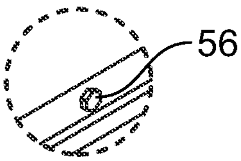
FIG. 2B is a perspective view of the fastening means used in securing the lower side wall to the base of the storage container.
Figure 2C:
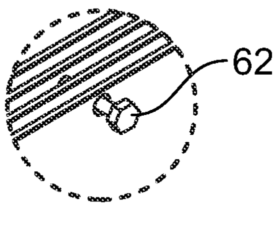
FIG. 2C is a perspective view of the fastening means used in securing the upper side wall to the lower side wall as the storage container or box is being collapsed.
Figure 2D:
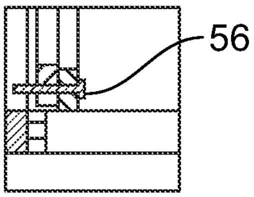
FIG. 2D is a cross-sectional view of the fastening means used in securing the lower side wall to the base of the storage container.
Figure 6A:
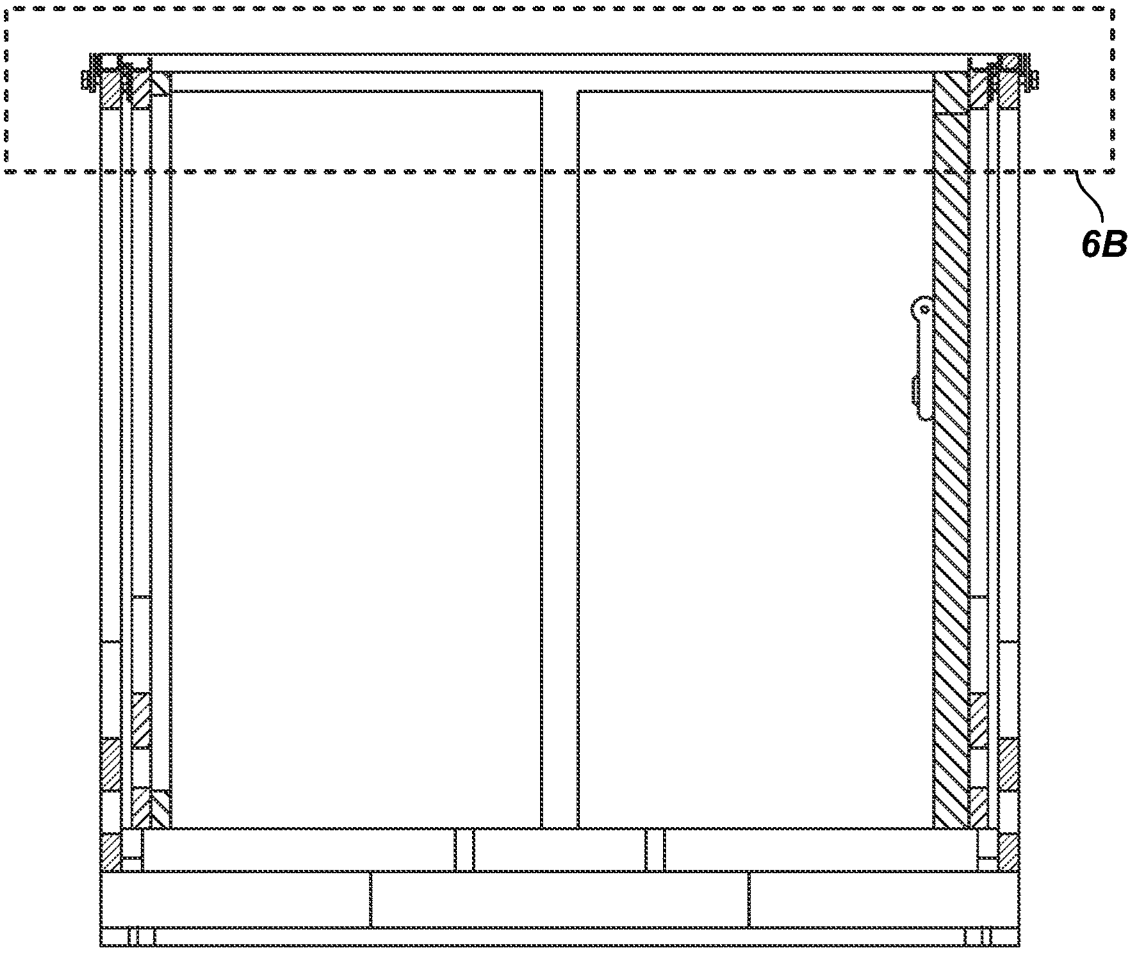
FIG. 6A is a front cross-sectional view illustrating the single stacked assembled position and, in particular, illustrating the connection of the applicable walls and those from the second container collapsed into the first container.
Figure 6B:
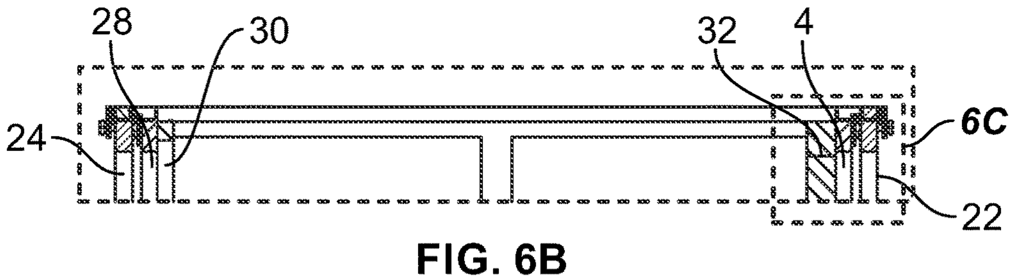
FIG. 6B is a partial front cross-sectional view illustrating the single stacked assembled position and, in particular, illustrating the connection of the applicable walls and those from the second container collapsed into the first container.
Figure 6C:
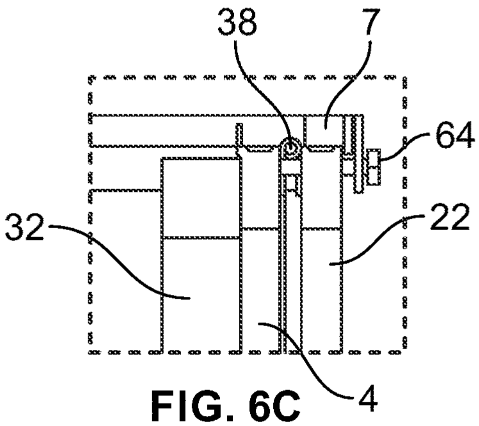
FIG. 6C is a partial front cross-sectional view illustrating the single stacked assembled position and, in particular, illustrating the connection of one side of the applicable walls and those from the second container collapsed into the first container.

Eighth, the roof 7 is then attached to the first lower side wall 22, the second lower side wall 24, the lower back wall 26, and the lower door 3. Preferably, this is accomplished using a hole 60 in the roof 7 and bolt 62, as illustrated in FIG. 2*c*. This is also further illustrated in FIGS. 6*a*-*c*. Also, the hinge means 38 is notched to receive the securing bolt 64.

In this manner, and once completed, the container 20 will have been transformed or collapsed from the fully double stacked assembled position, as illustrated in FIG. 1, to the single stacked assembled position, as illustrated in FIG. 2.

Turning to FIG. 7, the process for collapsing the container 20 from the single stacked assembled position, as illustrated in FIG. 2, to the fully collapsed position, as illustrated in FIG. 7, is more clearly illustrated. By removing the lower door 3, the lower back wall 26, the first lower side wall 22, and second lower side wall 24 of the first container 21 in the same manner as the same parts were removed from the second container 23, each of these can then be stacked on top of one another as illustrated in FIG. 7. In this manner, the container 20 of both the first container 21 and the second container 23 are transformed or collapsed into the fully collapsed position for shipping or transport.

VI. DETAILED DESCRIPTION OF A FIRST ALTERNATE PREFERRED EMBODIMENT

Figure 8:
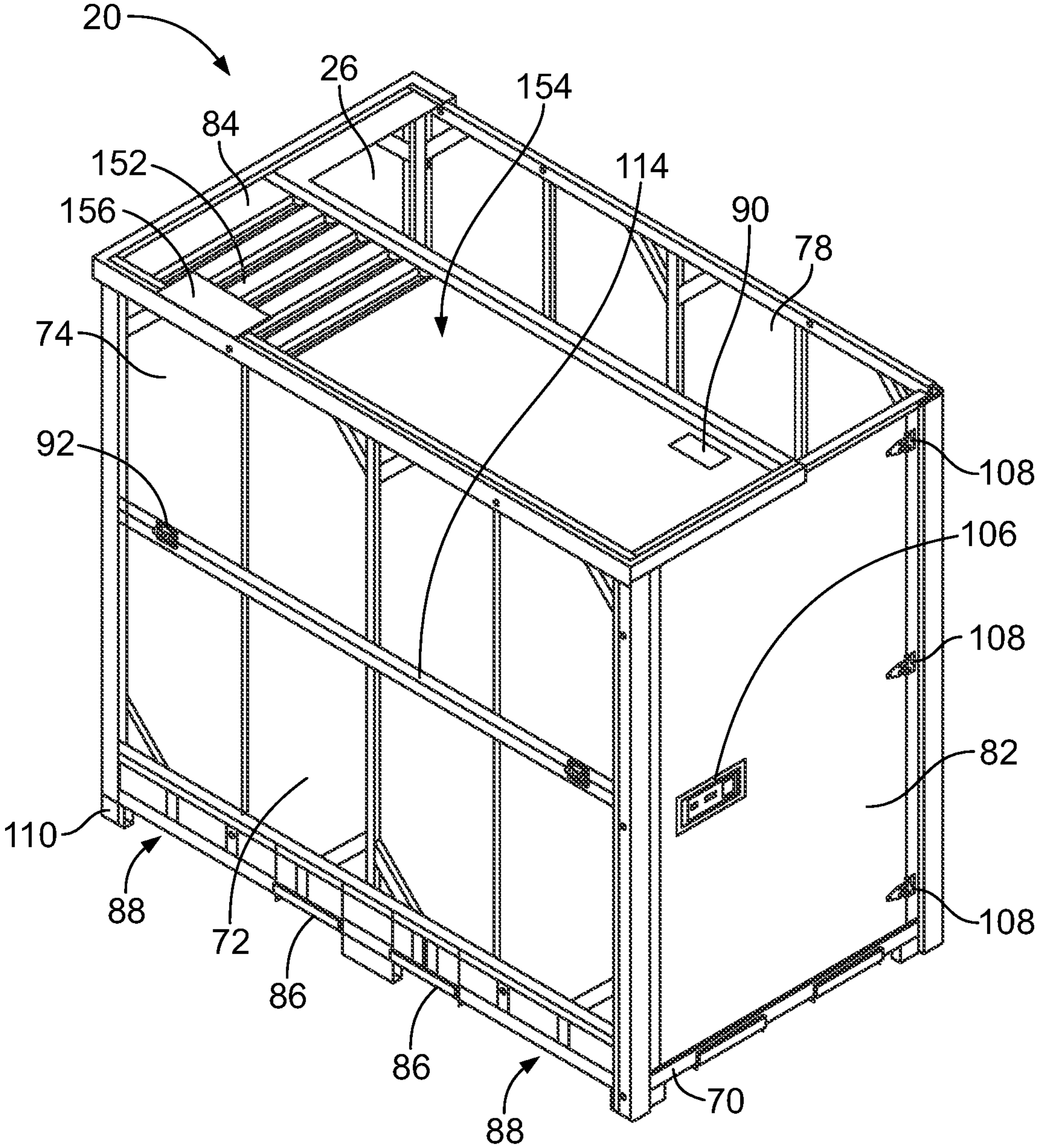
FIG. 8 is a perspective view of a first alternate preferred embodiment of Applicant's inventive collapsible container and, in particular, illustrating the container in the fully assembled position.

Turning first to FIG. 8, there is illustrated Applicant's first alternate preferred embodiment inventive collapsible container or box 20 (also referred to herein as "container 20"). The container 20, as illustrated, is in the fully assembled position and, as described in more detail below, may be collapsed from its fully assembled position to a fully collapsed position, as illustrated in FIG. 11.

The container 20 comprises a base 70, a first lower side wall 72, a first upper side wall 74, a second lower side wall 76 (see FIG. 9), a second upper side wall 78, a rear wall 80 (see FIG. 9), a door 82, and a roof 84.

Situated within the base 70 are castings 86 each having a plurality of openings 88 for lifting the container 20 by forklift or other lift trucks. Also, it is anticipated that the base 70 may be provided with swivel wheels to assist in moving the container 20 as well. Likewise, a global positioning system 90 is retained within the roof 84 for tracking the location and/or positioning of the container 20.

The first lower side wall 72 is hingedly connected to the first upper side wall 74 by a hinge means 92. In the preferred embodiment, the hinge means 92 comprises a single hinge, is rotatable through at least 180 degrees, and is located on the outside of the container 20. In the non-limiting example as illustrated, there are two (2) single hinge means 92, equally spaced apart, that are used to hingedly connect the first lower side wall 72 to the first upper side wall 74. Alternatively, the total number of single hinge means 92 used to connect the first lower side wall 72 to the first upper side wall 74 may be more or less depending upon the type, size, or shape of container 20 used.

A rubber seal strip 114, tightened between the first upper side wall 74 and the first lower side wall 72 is provided to prevent rain, moisture, and other contaminants from entering the container 20.

The second lower side wall 76 is secured to the second upper side wall 78 in the exact same manner as the first lower side wall 72 to the first upper side wall 74.

The second lower side wall 76 is also hingedly connected to the base 70 by a hinge means 94. In the preferred embodiment, the hinge means 94 comprises a single hinge, is rotatable through at least 90 degrees, and is located on the inside of the container 20. In the non-limiting example as illustrated, there are two (2) single hinge means 94, equally spaced apart, that are used to hingedly connect the second lower side wall 76 to the base 70. Alternatively, the total number of single hinge means 94 used to connect the second lower side wall 76 to the base 70 may be more or less depending upon the type, size, or shape of container 20 used. The location of the hinge means 94 between the second lower side wall 76 and the base 70 is situated a delta height 96 above the base 70.

The first lower side wall 72 is secured to the base 70 in the exact same manner as the second lower side wall 76 to the base 70, except that the location of the hinge means 94 between the first lower side wall 72 and the base 70 is situated a delta height 98 above the base 70.

The door 82 is releasably secured to the base 70 using bolts or any means known to one skilled in the art.

Figure 9A:
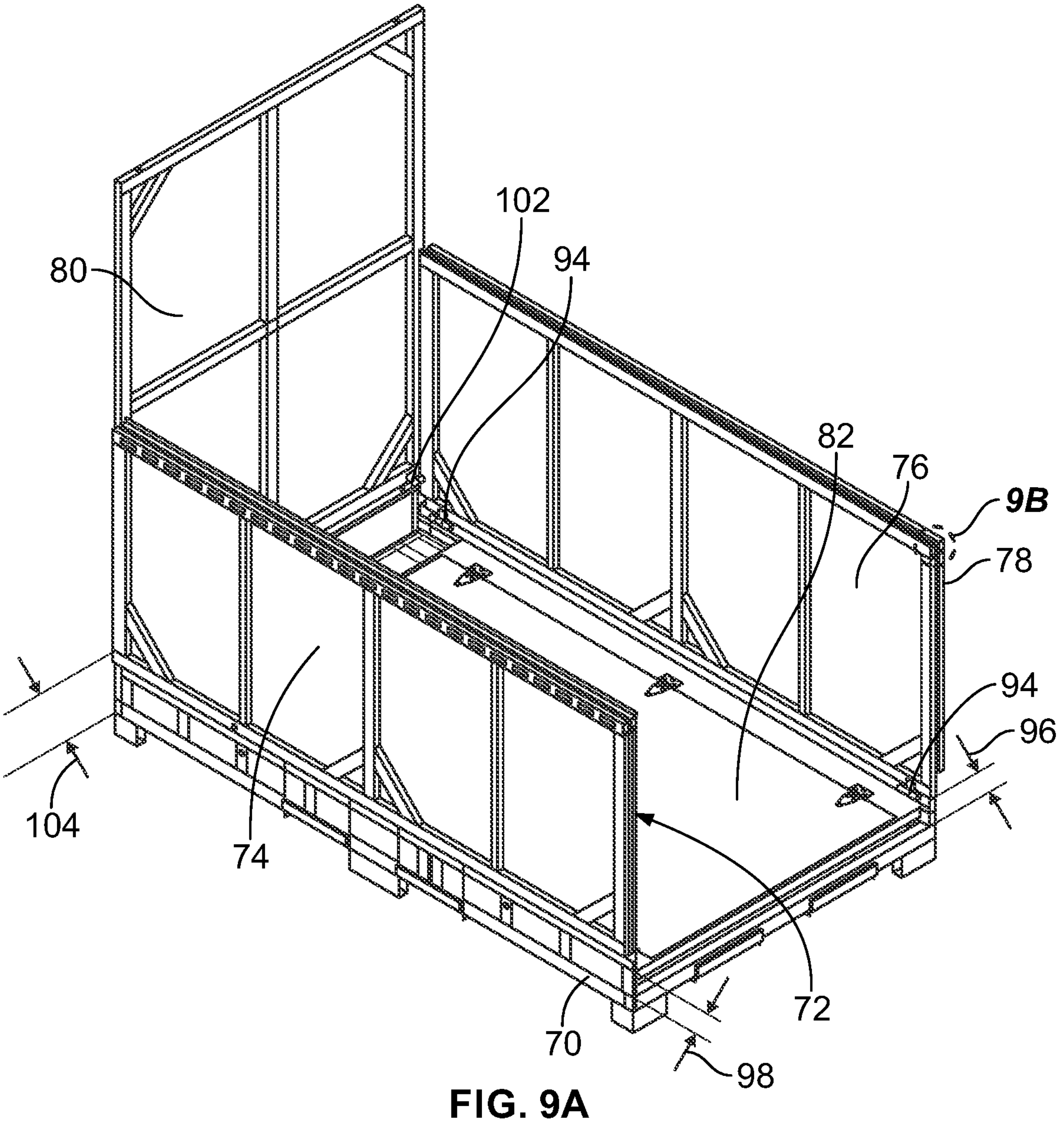
FIG. 9A is a perspective view of the first alternate preferred embodiment of Applicant's inventive collapsible container and, in particular, illustrating the container in the process of collapsing from its fully assembled position to a fully collapsed position.
Figure 9B:
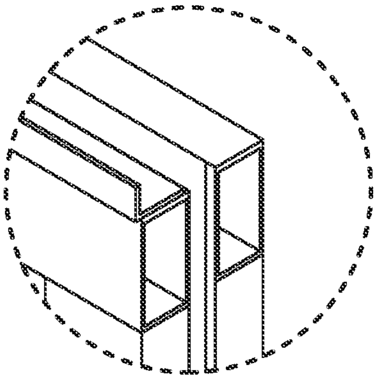
FIG. 9B is a perspective view of the first alternate preferred embodiment of Applicant's inventive collapsible container and, in particular, illustrating the second upper side wall folded or collapsed along the exterior of container.

The a rear wall 80 is hingedly connected to the base 70 by a hinge means 102 (see FIGS. 9 and 10). In the preferred embodiment, the hinge means 102 comprises a single hinge, is rotatable through at least 90 degrees, and is located on the inside of the container 20. In the non-limiting example as illustrated, there are two (2) single hinge means 102, equally spaced apart, that are used to hingedly connect the rear wall 80 to the base 70. Alternatively, the total number of single hinge means 102 used to connect the rear wall 80 to the base 70 may be more or less depending upon the type, size, or shape of container 20 used. The location of the hinge means 102 between the rear wall 80 and the base 70 is situated a delta height 104 above the base 70.

Also, the rear wall 80 is likewise secured to the first lower side wall 72, the first upper side wall 74, the second lower side wall 76, and/or the second upper side wall 78 by securing bolts (not illustrated). Alternatively, the means for securing the rear wall 80 to the first lower side wall 72, the first upper side wall 74, the second lower side wall 76, and/or the second upper side wall 78 may be any other means known to one skilled in the art.

Preferably, the hinge means 102 and hinge means 94 are the exact same. Alternatively, it is anticipated that each of these hinge means may be different provided that the hinge means accomplishes the invention described herein.

Also, preferably the delta height 98 between the first lower side wall 72 and the base 70 is larger than the delta height 96 between the second lower side wall 76 and the base 70; and the delta height 104 between the rear wall 80 and the base 70 is larger than the delta height 98 between the first lower side wall 72 and the base 70. In this manner, when each of the applicable sides are folded on top of one another during the process of collapsing the container 20 from the fully assembled position to the fully collapsed position, each of the applicable sides are folded into a horizontal position flush upon one another.

A rubber seal strip is also tightened between the first lower side wall 72 to the first upper side wall 74, and between the second lower side wall 76 to the second upper side wall 78, or in any other location within the container 20 to prevent rain, moisture, and other contaminants from entering the container 20.

The door 82 extends between the roof 84 and the base 70. In the preferred embodiment, the door 82 is likewise secured to the second lower side wall 76 and the second upper side wall 78 by securing bolts (not illustrated). The door 82 is releasably locked to the first lower side wall 72 and/or the first upper side wall 74, respectively, by a latching means 106. In the preferred embodiment, the latching means 106 is recessed in the door 82. Alternatively, the means for releasably locking the door 82 to first lower side wall 72 and/or the first upper side wall 74 may be any other means known to one skilled in the art. Lastly, the door 82 is provided with a second hinge means 108. In the preferred embodiment, the second hinge means 108 comprises a single hinge, is rotatable through at least 90 degrees, and allows the door 82 to be rotated in connection with the second lower side wall 76 and the second upper side wall 78, respectively, thereby allowing the container 20 to be freely opened and closed, as desired.

Situated at each of the corners of the container 20 are corner guards 110, and the roof 84 is secured and fits over the all sides and corner guards 110. This also prevents rain, moisture, and other contaminants from entering the container 20.

The roof 84 can preferably be made into a corrugated material 152 or flat material 154, each non-limiting example as illustrated in FIG. 8. If the roof 84 is made into a corrugated material 152, a plate 156 is placed along the exterior of the roof 84. In this manner, when the container 20 is in the fully collapsed position and stacked one upon another, as illustrated in FIG. 12, the plate 156 protects and prevents the corrugated material 152 of the roof 84 from being dented, compressed, or otherwise damaged. In the non-limiting example, if the entire roof 84 was made into corrugated material 152, preferably there would be three (3) plates 156, equally spaced apart, for a total of six (6) that are used, along each longitudinal exterior side of the roof 84. Alternatively, the total number of plates 156 used may be more or less depending upon the type, size, or shape of container 20 used. Additionally, this corrugated material 152 and plate 156 may be used in any of the embodiments described herein.

Turning to FIGS. 9, 10, and 11, the process for collapsing the container 20 from the fully assembled position, as illustrated in FIG. 8, to the fully collapsed position, as illustrated in FIG. 11, is more clearly illustrated.

First, the roof 84 is removed from attachment to the first upper side wall 74, the second upper side wall 78, the rear wall 80, and the door 82. In this manner, the roof 84 is completely removed from the container 20.

Second, the door 82 is folded or collapsed within the container 20. This includes: (a) unlocking the latching means 106 of the door 82 from the first lower side wall 72 and/or the first upper side wall 74; (b) removing the securing bolts (not illustrated) and thereby unsecuring the door 82 from the second lower side wall 76 and/or the second upper side wall 78 and the base 70; and (c) rotating the door 82, through substantially 90 degrees, until the door 82 engages the base 70. In this manner, the door 82 is completely folded inside the container 20.

Third, the first upper side wall 74 is folded or collapsed along the exterior of container 20. This includes: (a) removing any securing bolts (not illustrated), if necessary, and thereby unsecuring the first upper side wall 74 from the rear wall 80; and then, (b) rotating the first upper side wall 74 about the hinge means 92, through substantially 180 degrees, until the first upper side wall 74 is upside down and engages the exterior of the first lower side wall 72. In this manner, while the first upper side wall 74 and the first lower side wall 72 remain hingedly connected, the first upper side wall 74, originally situated in substantially a vertical orientation in alignment above the first lower side wall 72, is transformed or collapsed along the exterior of the container 20 with the first upper side wall 74 becoming situated in substantially a horizontal orientation (upside down) and positioned adjacent and parallel to the first lower side wall 72, as illustrated in FIG. 9, referred to herein as the "combined folded first side wall".

Fourth, the second upper side wall 78 is folded or collapsed along the exterior of container 20. This includes: (a) removing any securing bolts (not illustrated), if necessary, and thereby unsecuring the second upper side wall 78 from the rear wall 80; and then, (b) rotating the second upper side wall 78 about the hinge means 92, through substantially 180 degrees, until the second upper side wall 78 is upside down and engages the exterior of the second lower side wall 76. In this manner, while the second upper side wall 78 and the second lower side wall 76 remain hingedly connected, the second upper side wall 78, originally situated in substantially a vertical orientation in alignment above the second lower side wall 76, is transformed or collapsed along the exterior of the container 20 with the second upper side wall 78 becoming situated in substantially a horizontal orientation (upside down) and positioned adjacent and parallel to the second lower side wall 76, as illustrated in FIG. 9, referred to herein as the "combined folded second side wall".

Fifth, the combined folded second side wall is folded or collapsed into the container 20. This includes: (a) removing any securing bolts (not illustrated), if necessary, and thereby unsecuring the second lower side wall 76 from the rear wall 80; and then, (b) rotating the combined folded second side wall about the hinge means 94, through substantially 90 degrees, until the combined folded second side wall engages the door 82. In this manner, while the second upper side wall 78 and the second lower side wall 76 remain hingedly connected, and the second lower side wall 76 remains hingedly connected to the base 70, the combined folded second side wall, originally situated in substantially a vertical orientation in alignment to the base 70, is transformed or collapsed within the interior of the container 20 with the combined folded second side wall becoming situated in substantially a horizontal orientation and positioned adjacent and parallel on top of the door 1, as illustrated in FIG. 10.

Sixth, the combined folded first side wall is folded or collapsed into the container 20. This includes: (a) removing any securing bolts (not illustrated), if necessary, and thereby unsecuring the first lower side wall 72 from the rear wall 80; and then, (b) rotating the combined folded first side wall about the hinge means 94, through substantially 90 degrees, until the combined folded first side wall engages the combined folded second side wall. In this manner, while the first upper side wall 74 and the first lower side wall 72 remain hingedly connected, and the first lower side wall 72 remains hingedly connected to the base 70, the combined folded first side wall, originally situated in substantially a vertical orientation in alignment to the base 70, is transformed or collapsed within the interior of the container 20 with the combined folded first side wall becoming situated in substantially a horizontal orientation and positioned adjacent and parallel on top of the combined folded second side wall, as illustrated in FIG. 10.

Seventh, the rear wall 80 is folded or collapsed within the container 20. This includes: (a) rotating the rear wall 80 about the hinge means 102, through substantially 90 degrees, until the rear wall 80 engages the combined folded first side wall. In this manner, while the rear wall 80 remains hingedly connected to the base 70, the rear wall 80, originally situated in substantially a vertical orientation in alignment to the base 70, is transformed or collapsed within the interior of the container 20 with the rear wall 80 becoming situated in substantially a horizontal orientation and positioned adjacent and parallel on top of the combined folded first side wall, as illustrated in FIG. 11.

Eighth, the roof 84, previously removed, is placed in substantially a horizontal orientation and positioned adjacent and parallel on top of the combined folded first side wall, as illustrated in FIG. 11.

In the manner, the container 20 is in its fully collapsed position which consists of all of the sides substantially in a horizontal orientation and positioned adjacent and parallel on top of one another in the following order: base 70, door 82, combined folded second side wall 76, 78, combined folded first side wall 72, 74, rear wall 80, and roof 84.

Ninth, securing means 112 is then used to secure the container 20, in its fully collapsed position, together. Preferably, the securing means 112 is a bracket or any other means known to one skilled in the art. In the non-limiting example as illustrated, there are two (2) brackets, equally spaced apart, that are used. Alternatively, the total number of brackets used may be more or less depending upon the type, size, or shape of container 20 used.

In this manner, and once completed, the container 20 will have been transformed or collapsed from the fully assembled position, as illustrated in FIG. 8, to the fully collapsed position, as illustrated in FIG. 11. The container 20 can then be transformed or re-assembled from the fully collapsed position, as illustrated in FIG. 11, to the fully assembled position, as illustrated in FIG. 8, by reversing the process.

Turning to FIG. 12, in a non-limiting example, there is illustrated five (5) separate containers 20, each in their fully collapsed position, stacked one upon another. Alternatively, the total number of separate containers 20, each in their fully collapsed position, that may be stacked one upon another may be more or less depending upon the type, size, or shape of storage location or transport for these containers 20.

VII. DETAILED DESCRIPTION OF A SECOND ALTERNATE PREFERRED EMBODIMENT

Turning to FIG. 13, there is illustrated Applicant's second alternate preferred embodiment inventive collapsible container or box 20 (also referred to herein as "container 20"). The container 20, as illustrated, is in the fully assembled position and, as described in more detail below, may be collapsed from its fully assembled position to a fully collapsed position, as illustrated in FIGS. 17 through 21.

The container 20 comprises a base 114, a first side wall 116, a second side wall 118 (see FIG. 17), a rear wall 120 (see FIG. 14), a door 122, and a roof 124. Situated within the base 114 are castings 126 each having a plurality of openings 128 for lifting the container 20 by forklift or other lift trucks.

In this second alternate preferred embodiment, the door 122 is a bi-fold door separated into a left door 130 and a right door 132, each of which being releasably locked to one another by a latching means 134. Alternatively, the means for releasably locking the left door 130 to the right door 132 may be any other means known to one skilled in the art. Lastly, each of the left door 130 and the right door 132 are provided with a hinge means 136. In this second alternate preferred embodiment, the hinge means 136 comprises a single hinge, is rotatable through at least 180 degrees, and allows each of the left door 130 and right door 132 to be rotated in connection with their applicable sides of the container 20, respectively, thereby allowing the door 122 and container 20 to be freely opened and closed, as desired, as illustrated in FIG. 14.

Also, when this occurs, a stop 158 is provided to secure or lock the left door 130 and right door 132 to the frame 160. In the preferred embodiment, as the left door 130 or right door 132 are rotated outwardly to open the end of the container 20, the stop 158 comprises an arm 162 situated on both the left door 130 and right door 132 that is received into the reciprocal hole or slot 164 situated in the frame 160 thereby locking the left door 130 and/or right door 132 to the container 20.

In the non-limiting example as illustrated, there are three (3) single hinge means 136, equally spaced apart, that are used to hingedly connect each of the left door 130 and right door 132 to the container 20. Alternatively, the total number of single hinge means 136 used to connect the each of the left door 130 and right door 132 to the container 20 may be more or less depending upon the type, size, or shape of container 20 used.

The first side wall 116 is preferably separated into a plurality of additional side doors: left outside side door 138, left interior side door 140, right interior side door 142, and right outside side door 144. The left interior side door 140 and the right interior side door 142 are each releasably locked to one another by a latching means 146. In a non-limiting example, the latching means 146 is the same type of lock as the latching means 134 for the door 122. Alternatively, the means for releasably locking the left interior side door 140 to the right interior side door 142 may be any other means known to one skilled in the art.

Each of the left interior side door 140 and the right interior side door 142 are provided with a hinge means 148. In this second alternate preferred embodiment, the hinge means 148 comprises a single hinge, is rotatable through at least 180 degrees, and allows the left interior side door 140 to be rotated (clockwise) in connection with the left outside side door 138 and the right interior side door 142 to be rotated (counter-clockwise) in connection with the right outside side door 144, respectively, thereby allowing the left interior side door 140 and the right interior side door 142 to be freely opened and closed along the first side wall 116, as desired, as illustrated in FIG. 15.

In the non-limiting example as illustrated, there are three (3) single hinge means 148, equally spaced apart, that are used to hingedly connect each of the left interior side door 140 to the left outside side door 138 and the right interior side door 142 to the right outside side door 144. Alternatively, the total number of single hinge means 148 used to connect each of the left interior side door 140 to the left outside side door 138 and the right interior side door 142 to the right outside side door 144 may be more or less depending upon the type, size, or shape of container 20 used.

Also, when the left interior side door 140 is rotated (clockwise) in connection with the left outside side door 138 and the right interior side door 142 is rotated (counter-clockwise) in connection with the right outside side door 144, a stop 166 is provided to secure or lock the left outside side door 138 to the left outside side door 138 and the right interior side door 142 to the right outside side door 144. In the preferred embodiment, the stop 166 comprises an arm 168 situated on both the left interior side door 140 and right interior side door 142 that is received into the reciprocal hole or slot 170 and 172 situated in the left outside side door 138 and right outside side door 144, respectively, thereby locking the left interior side door 140 to the left outside side door 138 and the right interior side door 142 to the right outside side door 144.

Each of the left outside side door 138 and the right outside side door 144 are likewise provided with a hinge means 150. In this second alternate preferred embodiment, the hinge means 150 comprises a single hinge, is rotatable through at least 180 degrees, and allows the left outside side door 138 to be rotated (clockwise) in connection with the container 20 and the right outside side door 144 to be rotated (counter-clockwise) in connection with the opposite end of the container 20, respectively, thereby allowing the left outside side door 138 and the right outside side door 144 to be freely opened and closed along the first side wall 116, as desired, as illustrated in FIG. 16.

In the non-limiting example as illustrated, there are three (3) single hinge means 150, equally spaced apart, that are used to hingedly connect each of the left outside side door 138 to the frame 160 of the container 20 and the right outside side door 144 to the opposite end of the frame 160 of the container 20. Alternatively, the total number of single hinge means 150 used to connect each of the left outside side door 138 to the container 20 and the right outside side door 144 to the opposite end of the container 20 may be more or less depending upon the type, size, or shape of container 20 used.

Preferably, the hinge means 150 and hinge means 148 are the exact same. Alternatively, it is anticipated that each of these hinge means may be different provided that the hinge means accomplishes the invention described herein.

Turning to FIGS. 17 through 21, the process for collapsing the container 20 from the fully assembled position, as illustrated in FIG. 13, to the fully collapsed position, as illustrated in FIG. 21, is more clearly illustrated.

First, the roof 124 is removed from attachment to the first side wall 116, the second side wall 118 (see FIG. 17), the rear wall 120 (see FIG. 14), and the door 122. In this manner, the roof 124 is completely removed from the container 20.

Second, the door 122 is folded or collapsed within the container 20. This includes: (a) unlocking the door 122; (b)

removing or unsecuring the door 122; and (c) rotating the door 122 about the hinge means 174, through substantially 90 degrees, until the door 122 engages the base 114. Preferably, the hinge means 174 is the same as hinge means 176. In this manner, the door 122 is completely folded inside the container 20, as illustrated in FIG. 17.

Third, the rear wall 120 is folded or collapsed into the container 20. This includes: (a) removing or unsecuring the rear wall 120; and then, (b) rotating the rear wall 120 about the hinge means 174, through substantially 90 degrees, until the rear wall 120 engages the door 122. Preferably, the hinge means 174 is the same as hinge means 176. In this manner, while the rear wall 120 remains hingedly connected to the base 114, the rear wall 120, originally situated in substantially a vertical orientation in alignment to the base 114, is transformed or collapsed within the interior of the container 20 with the rear wall 120 becoming situated in substantially a horizontal orientation and positioned adjacent and parallel on top of the door 122, as illustrated in FIG. 18.

Third, the second side wall 118 is folded or collapsed into the container 20. This includes: (a) removing any securing bolts (not illustrated), if necessary, and thereby unsecuring the second side wall 118 from the frame 160; and then, (b) rotating the second side wall 118 about hinge means 176 (as illustrated in FIG. 16A, through substantially 90 degrees, until the second side wall 118 engages the rear wall 120. In this manner, while the second side wall 118 remain hingedly connected to the base 114, the second side wall 118, originally situated in substantially a vertical orientation in alignment to the base 114, is transformed or collapsed within the interior of the container 20 with the second side wall 118 becoming situated in substantially a horizontal orientation and positioned adjacent and parallel on top of the rear was 120 as illustrated in FIG. 19.

Fourth, the first side wall 116 is folded or collapsed into the container 20. This includes: (a) removing any securing bolts (not illustrated), if necessary, and thereby unsecuring the first side wall 116; and then, (b) rotating the first side wall 116, through substantially 90 degrees, until the first side wall 116 engages the second side wall 118. In this manner, the first side wall 116 does not remain connected to the base 114, the first side wall 116, originally situated in substantially a vertical orientation in alignment to the base 114, is transformed or collapsed within the interior of the container 20 with the first side wall 116 becoming situated in substantially a horizontal orientation and positioned adjacent and parallel on top of the second side wall 118 as illustrated in FIG. 20. Alternatively, if desired, the first side wall 116 could be hingedly connected to the base 114 in the same manner as the second side wall 118 described above.

Sixth, the roof 124, previously removed, is placed in substantially a horizontal orientation and positioned adjacent and parallel on top of the first side wall 116, as illustrated in FIG. 21.

In the manner, the container 20 is in its fully collapsed position which consists of all of the sides substantially in a horizontal orientation and positioned adjacent and parallel on top of one another in the following order: base 114, door 122, rear wall 120, second side wall 118, first side wall 116, and roof 124.

In this manner, and once completed, the container 20 will have been transformed or collapsed from the fully assembled position, as illustrated in FIG. 13 or 17, to the fully collapsed position, as illustrated in FIG. 21. The container 20 can then be transformed or re-assembled from the fully collapsed position, as illustrated in FIG. 21, to the fully assembled position, as illustrated in FIG. 13 or 17, by reversing the process.

Additionally, any of the hinge means described herein can further be designed to include the components as illustrated in FIGS. 22-25. The hinge means 179 comprises a pin 178, a knuckle 180, a leaf 182, a hole 184, and a bracket 186. The hinge means 179 is fixedly secured to a part 196 of the container by attaching the knuckle 180 to a desired location 188 on the part 196, attaching the bracket 186 to a desired location 190 on the roof 192, and then securing the leaf 182 to a threaded hole 197 in the bracket 186 using a nut 192 and bolt 194 or any other fastening means known to one skilled in the art.

During the process of building or forming any of the container(s) described herein, the leaf 182 must be in alignment with the threaded hole 197 in the bracket 186 in order to fixedly secure the hinge means 179 to the container. With each of the container(s) utilizing many hinge means at various locations, and all of the parts of the hinge means 179 (e.g., pin 178, knuckle 180, and leaf 182 on the part 196 of the container; and the bracket 186 on the roof 192) are likely pre-installed before assembly of, for example, the roof 192 to the part 196 of the container. Certainly, many of the hinge means 179 will be in proper alignment for being fixedly secured. For those hinge means 179 that are not in proper alignment, either the pin 178, knuckle 180, and leaf 182 on the part 196 of the container will need to be removed, re-adjusted or moved, and re-attached or the bracket 186 on the roof 192 will need to be removed, re-adjusted or moved, and re-attached in order to achieve proper alignment. Depending upon how many hinge means 179 require to be removed, re-adjusted or moved, and re-attached and how many containers are being built, although this is easy enough, this could end of being very time consuming and certainly delay the process of building or forming any of the container(s) described herein.

Applicant, however, has solved this problem as well by creating a "slideable" hinge. Referring to FIG. 25, the pin 178, having opposed ends 198 and 200, is inserted through the opening 206 and into the knuckle 180 leaving or creating a spacing 202 and 204 between the opposed ends 198 and 200 of the pin 178 and the distal ends 208 and 210 of the knuckle 180. In this manner, if the hinge means 179 is not in proper alignment, the pin 178 may be "slideable" or traversed or moved within the knuckle 180 to achieve proper alignment. In a non-limiting example, depending upon where the location and mis-alignment of the leaf 182 is in relation to the threaded hole 197 in the bracket 186, proper alignment may be achieved by either:

- moving the pin 178 in the direction of Arrow A. In this manner, the spacing 202 allows the further movement of the pin 178, and adjustment of the pin 178 within the knuckle 180, more toward the distal end 208 of the knuckle 180. As this occurs, the movement of the pin 178 in the direction of Arrow A likewise allows the movement of the leaf 182 in that same direction of Arrow A until the leaf 182 becomes aligned with the threaded hole 197 in the bracket 186 to thereby properly fixedly secure the hinge means 179 to the container; or
- moving the pin 178 may in the direction of Arrow B. In this manner, the spacing 204 allows the further movement of the pin 178, and adjustment of the pin 178 within the knuckle 180, more toward the distal end 210 of the knuckle 180. As this occurs, the movement of the pin 178 in the direction of Arrow B likewise allows the movement of the leaf 182 in that same direction of Arrow B until the leaf 182 becomes aligned with the threaded hole 197 in the bracket 186 to thereby properly fixedly secure the hinge means 179 to the container. As a result, in either instance, Applicant's inventive "slideable" hinge eliminates the time consuming, inefficient process of having to remove, adjust or move, and re-attach (e.g., detach, move, and re-attach the pin 178, the knuckle 180, and leaf 182 or the bracket 186 on the roof 192) in order to achieve proper alignment to fixedly secure the hinge means 179 to the container.

Thus, there has been provided Applicant's unique collapsible storage container or box. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the disclosure contained herein and appended claims.

What is claimed is:

1. A hinge for securing a first part of a container to a second part of a container, comprising:

a knuckle providing a first end and a second end separated from one another with the first end containing a first opening and the second end containing a second opening, the first opening and the second opening in alignment along a first plane between them, each of the first end and the second end being fixedly secured to the first part of the container;

a pin having a body and opposed ends and in slideable engagement with the knuckle with one of the opposed ends situated within the first opening of the first end and the other of the opposed ends situated within the second opening of the second end, the pin moveable along the first plane between the first end and the second end with one of the opposed ends freely moveable within the first opening and the other of the opposed ends freely moveable within the second opening;

a leaf having a leaf body and opposed leaf ends with one of the opposed leaf ends fixedly secured along the body of the pin, the leaf body extending outwardly and perpendicular to the first plane and providing a leaf hole adjacent the other of the opposed leaf ends;

a bracket having a bracket body and fixedly secured to the second part of the container, the bracket body providing a bracket hole;

means for fastening the leaf to the bracket; and whereby, when securing the first part of a container to the second part of a container, if the leaf hole of the leaf body is not in alignment with the bracket hole of the bracket body to secure the leaf to the bracket, the pin may be moveable along the first plane with one of the opposed ends being freely moveable further into the first opening of the first end and the other of the opposed ends being freely moveable further out of the second end with the in remaining slideable engagement with the knuckle or the pin may be moveable along first plane with the other of the opposed ends being freely moveable further into the second opening of the second end and the one of the opposed ends being freely moveable further out of the first end with the pin remaining in slideable engagement with the knuckle to move the leaf hole of the leaf body into alignment with the bracket hole of the bracket body for securing the first part of the container to the second part of the container.

2. The hinge of claim 1 wherein a spacing is created between each of the opposed ends of the pin and a distal end in each of the first end and the second end of the knuckle.

3. The hinge of claim 2 wherein the spacing between each of the opposed ends of the pin and the distal end in each of the first end and the second end of the knuckle permits the pin to slideably traverse in relation to the knuckle.

4. The hinge of claim 1 wherein the first part of the container is a different part than the second part of the container.

5. The hinge means of claim 1 wherein the one of the opposed leaf ends of the leaf is fixedly secured along the body of the pin in a location between the first end and the second end of the knuckle.

* * * * *